(12) United States Patent
Lim et al.

(10) Patent No.: US 11,963,261 B2
(45) Date of Patent: Apr. 16, 2024

(54) METHOD AND APPARATUS FOR RECOVERING PROFILE IN CASE OF DEVICE CHANGE FAILURE

(71) Applicant: Samsung Electronics Co., Ltd., Suwon-si (KR)

(72) Inventors: Taehyung Lim, Suwon-si (KR); Kangjin Yoon, Suwon-si (KR); Jonghoe Koo, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/458,014

(22) Filed: Aug. 26, 2021

(65) Prior Publication Data

US 2022/0070655 A1    Mar. 3, 2022

(30) Foreign Application Priority Data

Aug. 26, 2020  (KR) .................. 10-2020-0107587
Sep. 18, 2020  (KR) .................. 10-2020-0120692
(Continued)

(51) Int. Cl.
*H04W 8/18*      (2009.01)
*H04L 41/0806*   (2022.01)
(Continued)

(52) U.S. Cl.
CPC ......... *H04W 8/183* (2013.01); *H04L 41/0806* (2013.01); *H04L 67/303* (2013.01); *H04L 67/306* (2013.01)

(58) Field of Classification Search
CPC .................................................. H04W 8/183
See application file for complete search history.

(56) References Cited

U.S. PATENT DOCUMENTS 10,349,267 B1      7/2019   Chen et al.
2013/0344864 A1   12/2013   Park et al.
(Continued)

FOREIGN PATENT DOCUMENTS

EP      3499931 A1    6/2019
KR    102135240 B1    7/2020

OTHER PUBLICATIONS

International Search Report and Written Opinion of the International Searching Authority dated Nov. 23, 2021, in connection with International Application No. PCT/KR2021/011420, 7 pages.
(Continued)

*Primary Examiner* — Hsinchun Liao

(57) ABSTRACT

The disclosure relates to a communication technique for combining an IoT technology with a 5G communication system for supporting a higher data transmission rate than that of a beyond-4G system, and a system therefor. The disclosure may be applied to intelligent services (for example, smart homes, smart buildings, smart cities, smart cars or connected cars, health care, digital education, retail businesses, security and safety related services, and the like) based on 5G communication technologies and IoT-related technologies. The disclosure provides a method and apparatus for recovering a profile in the case of a profile movement failure during a movement of a profile between smart security media.

20 Claims, 13 Drawing Sheets

(30) Foreign Application Priority Data

Oct. 7, 2020 (KR) ........................ 10-2020-0129271
Oct. 30, 2020 (KR) ........................ 10-2020-0143733
Apr. 5, 2021 (KR) ........................ 10-2021-0043754

(51) Int. Cl.
*H04L 67/303* (2022.01)
*H04L 67/306* (2022.01)

(56) References Cited

U.S. PATENT DOCUMENTS

| | | |
|---|---|---|
| 2015/0237551 A1 | 8/2015 | Jin et al. |
| 2016/0134991 A1 | 5/2016 | Lee et al. |
| 2016/0241537 A1 | 8/2016 | Cha et al. |
| 2017/0048349 A1* | 2/2017 | Ahn ........................ H04W 4/44 |
| 2019/0053040 A1 | 2/2019 | Long |
| 2019/0075453 A1 | 3/2019 | Yoon et al. |
| 2020/0221294 A1* | 7/2020 | Kang .................... H04W 12/35 |
| 2020/0228962 A1 | 7/2020 | Park et al. |

OTHER PUBLICATIONS

Supplementary European Search Report dated Jan. 4, 2024, in connection with European Patent Application No. 21862086.2, 7 pages.

\* cited by examiner

METHOD AND APPARATUS FOR RECOVERING PROFILE IN CASE OF DEVICE CHANGE FAILURE

CROSS-REFERENCE TO RELATED APPLICATIONS

This application is based on and claims priority under 35 U.S.C. § 119 to Korean Patent Application No. 10-2020-0107587 filed on Aug. 26, 2020, Korean Patent Application No. 10-2020-0120692 filed on Sep. 18, 2020, Korean Patent Application No. 10-2020-0129271 filed on Oct. 7, 2020, Korean Patent Application No. 10-2020-0143733 filed on Oct. 30, 2020, and Korean Patent Application No. 10-2021-0043754 filed on Apr. 5, 2021, in the Korean Intellectual Property Office, the disclosures of which are herein incorporated by reference in their entirety.

BACKGROUND

1. Field

The disclosure relates to a smart security medium and, more specifically, to a method and an apparatus for recovering a profile in the case of a profile movement failure when a profile is moved between smart security media.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Various services can be provided in line with development of mobile communication systems as described above, and a scheme for effectively providing such services is required. For example, there is a need for a method for moving a profile (or a profile package) online between two devices in a safe and efficient manner.

The above information is presented as background information only to assist with an understanding of the disclosure. No determination has been made, and no assertion is made, as to whether any of the above might be applicable as prior art with regard to the disclosure.

SUMMARY

A disclosed embodiment provides an apparatus and a method for recovering a profile in the case of a profile movement failure while a profile is moved between security modules included in two electronic devices.

In accordance with an aspect of the disclosure, a method is performed by a first device in a communication system. The method comprises transmitting, to a server, a device change request for installing a profile in the first device onto a second device; receiving, from the server, a device change response for the device change request instructing to delete the profile; deleting the profile in the first device based on the response; and transmitting, to the server, a recovery request for the deleted profile based on a stored address of the server.

In accordance with another aspect of the disclosure, a method is performed by a server in a communication system, the method comprises receiving, from a first device, a device change request for installing a profile in the first device onto a second device; transmitting, to the first device, a device change response for the device change request instructing to delete the profile; and receiving, from the first device, a recovery request for the deleted profile, wherein an address of the server has stored in the first device.

In accordance with another aspect of the disclosure, a first device in a communication system comprises a transceiver; and a controller configured to transmit, via the transceiver to a server, a device change request for installing a profile in the first device onto a second device, receive, via the transceiver from the server, a device change response for the device change request instructing to delete the profile, delete the profile in the first device based on the response, and transmit, via the transceiver to the server, a recovery request for the deleted profile based on a stored address of the server.

In accordance with another aspect of the disclosure, a server in a communication system, the server comprises a transceiver; and a controller configured to receive, via the transceiver from a first device, a device change request for installing a profile in the first device onto a second device, transmit, via the transceiver to the first device, a device change response for the device change request instructing to delete the profile, and receive, via the transceiver from the first device, a recovery request for the deleted profile, wherein an address of the server has stored in the first device According to various embodiments of the disclosure, if a movement failure occurs while a profile installed in a device is moved to another device, the profile installed in the original device can be recovered.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
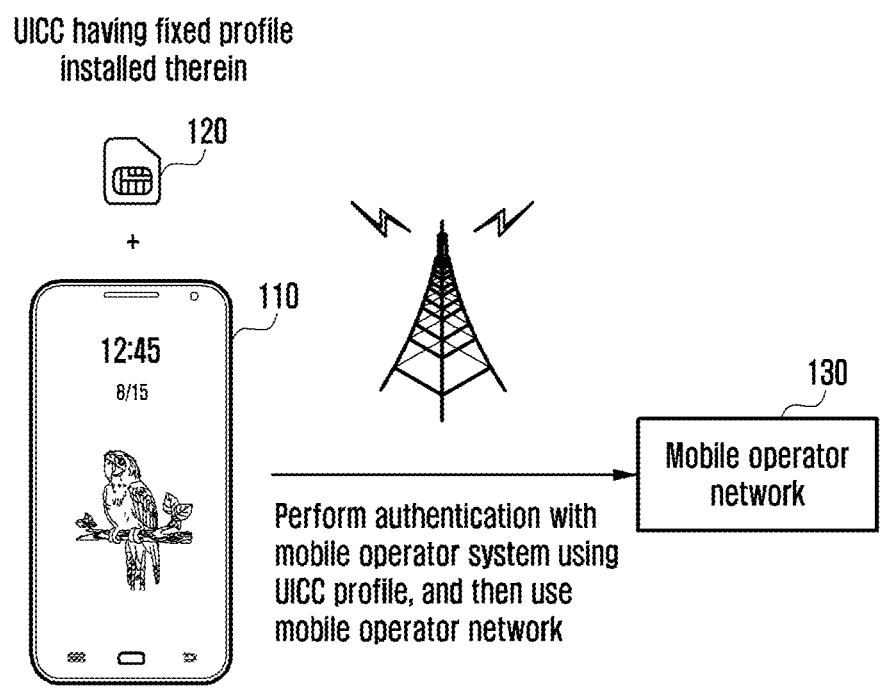
FIG. 1 illustrates a method of connecting a terminal to a mobile communication network using a UICC having a fixed profile installed in the terminal according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card.

In the disclosure, modifiers such as "the first", "the second", or the like, as used herein, may be used to distinguish respective terms from each other in describing embodiments. Terms modified by modifiers such as "the first" and "the second" may refer to different objects. However, terms modified by modifiers such as "the first" and "the second" may refer to the same object. That is, modifiers such as "the first" and "the second" may be used to refer to the same object from different viewpoints. For example, modifiers such as "the first" and "the second" may be used to distinguish the same object according to functions or operations. For example, the first user and the second user may refer to the same user.

Further, in the disclosure, each of embodiments is described by taking the SSP and the UICC as an example of a security medium, but the scope of the disclosure is not limited to that by the SSP and the UICC. For example, it is apparent to those skilled in the art that various embodiments described below may be applied substantially the same or similarly to other security media that perform substantially the same or similar functions as those of the SSP and the UICC.

The specific terms used in the following description are provided to help understanding the disclosure, and such specific terms may be changed into other forms without departing from the technical spirit of the disclosure.

A "universal integrated circuit card (UICC)" is a smart card that is inserted and used in a mobile communication terminal or the like, and is also referred to as a UICC card. The UICC denotes a chip that stores personal information of a mobile communication subscriber, such as network access authentication information, a phone number list, and an SMS, and performs subscriber authentication and traffic security key generation when access is made to a mobile communication network, such as GSM, WCDMA, LTE, etc., thereby making it possible to stably use mobile communication.

The UICC may include an access control module for accessing a network of a mobile operator. The access control module includes a universal subscriber identity module (USIM), a subscriber identity module (SIM), an IP multimedia service identity module (ISIM), and the like, for example. A UICC including a USIM may be referred to as a USIM card. Similarly, a UICC including a SIM module may be referred to as a SIM card. The terms "SIM card," "UICC card," "USIM card," and "UICC in which ISIM is included" in the disclosure may be used as the same meaning herein. That is, contents of the disclosure may be equally applied to a SIM card, a USIM card, an ISIM card, or a general UICC card.

Meanwhile, the SIM module may be installed during UICC manufacturing or may be downloaded to the UICC card for a mobile communication service to be used at a time desired by a user. Further, it is possible to download and install a plurality of SIM modules to the UICC card and to select and use at least one SIM module. The UICC card may be fixed or may not be fixed in a terminal. The UICC fixed in a terminal is referred to as an embedded UICC (eUICC) and specifically, a UICC embedded in a system-on-chip (SoC), including a communication processor of a terminal, an application processor, or a single processor structure in which the communication processor and the application processor are integrated, may be referred to as an integrated UICC (iUICC). Typically, the eUICC and the iUICC are fixed to the terminal and used, and may denote a UICC card including functions capable of remotely downloading at least one SIM module and selecting one SIM module among the downloaded SIM modules.

In the disclosure, the UICC card including functions capable of remotely downloading at least one SIM module and selecting the SIM module will be referred to as the eUICC or iUICC. That is, UICC cards, which are fixed or not fixed in a terminal among UICC cards including functions capable of remotely downloading the SIM module and selecting the SIM module, are collectively referred to as the eUICC or iUICC.

In the disclosure, the term UICC may be interchangeably used with SIM, and the term eUICC may be interchangeably used with eSIM.

The term "eUICC identifier (eUICC ID)" may be a unique identifier of the eUICC embedded in a terminal, and may be referred to as an EID. In addition, when a provisioning profile is pre-installed in the eUICC, the eUICC identifier (eUICC ID) may be an identifier of the corresponding provisioning profile (profile ID of the provisioning profile). In addition, in an embodiment of the disclosure, when the terminal and the eUICC chip are not separated, the eUICC identifier (eUICC ID) may be a terminal ID. In addition, the eUICC identifier (eUICC ID) may refer to a specific secure domain of the eUICC chip.

The term "profile" may denote a data object such as an application, a file system, and an authentication key value stored in the UICC.

In the disclosure, the term "profile package" may denote that contents of the "profile" are packaged in a software format that can be installed in the UICC. The "profile package" may be called a profile TLV or a profile package TLV. When the profile package is encrypted using an encryption parameter, the profile package may be called a protected profile package (PPP) or a protected profile package TLV (PPP TLV). When the profile package is encrypted using an encryption parameter that can only be decrypted by a specific eUICC, the profile package may be called a bound profile package (BPP) or a bound profile package TLV (BPP TLV). The profile package TLV may be a data set expressing information configuring a profile in a TLV (tag, length, value) format. In the disclosure, "profile package" may be used interchangeably with "profile."

In the disclosure, the "state" of the profile may be as follows.

[Enabled]

In the disclosure, an operation of enabling the profile by a terminal denotes an operation of configuring the terminal to receive a communication service through a mobile operator having provided the profile by changing the state of the profile to an enabled state. The profile in the enabled state may be expressed as an "enabled profile."

[Disabled]

In the disclosure, an operation of disabling the profile by a terminal denotes an operation of configuring the terminal not to receive a communication service through a mobile operator having provided the profile by changing the state of the profile to a disabled state. The profile in the disabled state may be expressed as a "disabled profile."

[Deleted]

In the disclosure, an operation of deleting a profile by a terminal may denote an operation of configuring the terminal not to enable or disable the profile any longer by changing the state of the profile to a deleted state. The profile in the deleted state may be expressed as a "deleted profile."

In the disclosure, the operation of enabling, disabling, or deleting a profile by a terminal may denote the operation of marking each profile as "to be enabled," "to be disabled," or "to be deleted," without immediately changing the state of each profile to enabled, disabled, or deleted, and then changing the state of each profile to "activated," "deactivated," or "deleted" after the terminal or the UICC of the terminal performs a specific operation (e.g., a refresh or reset command). The operation of marking the profiling as a scheduled state (i.e., to be enabled, to be disabled, or to be deleted) may not be limited necessarily to mark one scheduled state for one profile, and it is possible to mark one or more profiles to be in scheduled states that are the same or different from each other, mark one profile as to be in one or more scheduled states, or mark one or more profiles as to be in scheduled states that are the same or different from each other, respectively.

In addition, when the terminal displays one or more scheduled states for a predetermined profile, two marks of scheduled states may be integrated into one mark. For example, if a predetermined profile is marked as to be disabled and to be deleted, the profile may be marked as combined form of "to be disabled and deleted."

In addition, the terminal may sequentially or simultaneously perform the operation of marking the scheduled state for one or more profiles. In addition, the terminal may sequentially or simultaneously perform an operation of marking a scheduled state for one or more profiles and then actually changing the state of the profile.

The term "profile delimiter" may be referred to as a profile identifier (profile ID), an integrated circuit card ID (ICCID), a matching ID, an event identifier (event ID), an activation code, an activation code token, a command code, a command code token, a signed command code, an unsigned command code, an ISD-P, or a factor matching a profile domain (PD). The profile ID may indicate a unique identifier of each profile. The profile delimiter may further include an address of a profile providing server (SM-DP+) capable of indexing a profile. In addition, the profile delimiter may further include a signature of the profile providing server (SM-DP+).

The term "remote SIM provisioning (RSP) server" may be used as a name to refer to a profile providing server and/or a profile management server and/or an open mediation server, which will be described later. The RSP server may be expressed as a subscription manager XX (SM-XX).

In the disclosure, the term "profile providing server" may include a function of generating a profile, encrypting a generated profile, generating a profile remote management command, or encrypting a generated profile remote management command. The profile providing server may be expressed as at least one of a subscription manager data preparation (SM-DP), a subscription manager data preparation plus (SM-DP+), an off-card entity of profile domain, a profile encryption server, a profile generation server, a profile provisioner (PP), a profile provider, or a profile provisioning credentials holder (PPC holder).

In the disclosure, a "profile management server" may include a function of managing a profile. The profile management server may be expressed as a subscription manager secure routing (SM-SR), a subscription manager secure routing plus (SM-SR+), an off-card entity of eUICC profile manager, a profile management credentials holder (PMC holder), a eUICC manager (EM), a profile manager (PP), or the like.

In the disclosure, the profile providing server may also provide a function of the profile management server.

Accordingly, in various embodiments of the disclosure, an operation of the profile providing server may also be performed by the profile management server. Likewise, the operation of the profile management server or the SM-SR may also be performed by the profile providing server.

In the disclosure, the term "open mediation server" may be expressed as a subscription manager discovery service (SM-DS), a discovery service (DS), a root open mediation server (root SM-DS), and an alternative open mediation server (alternative SM-DS). The open mediation server may receive an event registration request from one or more profile providing servers or open mediation servers. Further, the one or more open mediation servers may be used in combination, and a first open mediation server may receive an event registration request from a second open mediation server as well as the profile providing server.

The term "mobile operator" may refer to a business that provides a communication service to a terminal, and may be a term collectively referring a business supporting system (BSS), an operational supporting system (OSS), and a point of sale (POS) terminal of a mobile operator, and other IT systems. Further, in the disclosure, the mobile operator is not limited to expressing only one specific business that provides communication services, and may be used as a term referring to a group or association (or consortium) of one or more businesses or an agency representing the group or association. In addition, in the disclosure, a mobile operator may be referred to as an operator (OP or Op.), a mobile network operator (MNO), a mobile virtual network operator (MVNO), a service provider (SP), a profile owner (PO), etc., and each mobile operator may configure or be assigned at least one name and/or a unique identifier (an object identifier (OID)) of the mobile operator. If a mobile operator refers to a group, association, or agency of one or more businesses, the name or unique identifier of a predetermined group, association, or agency may be shared by all businesses belonging to the group or association or all businesses working with the agency.

The term "subscriber" may be used as referring to a service provider having ownership of a terminal or an end user having ownership of the terminal. In general, a terminal owned by a service provider may be referred to as an M2M device, and a terminal owned by a user may be referred to as a user device (consumer device). In a case of an M2M terminal, an end user who uses a terminal by taking over or leasing the terminal from a service provider may exist although the user does not have ownership of the terminal, and here, the subscriber may be different from or the same as the service provider.

The term "subscriber intent" may be used as collectively referring to the intention of a subscriber for local management or remote management of a profile. Further, in a case of local management, the subscriber intent may refer to an end user intent, and in a case of remote management, the subscriber intent may be used as a term referring to a service provider intent.

The term "end user consent" may be used to indicate whether a user consents to perform local management or remote management.

The term "terminal" may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a moving node, a mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. Furthermore, a terminal may include, but is not limited to a machine to machine (M2M) terminal and a machine type communication (MTC) terminal/device. In the disclosure, the terminal may be referred to as an electronic device.

In the disclosure, a UICC capable of downloading and installing a profile may be embedded in the electronic device. If the UICC is not embedded in the electronic device, a UICC physically separated from the electronic device may be connected to the electronic device by being inserted into the electronic device. For example, the UICC may be in the form of a card so as to be inserted into the electronic device. The electronic device may include a terminal, and the terminal may be a terminal including the UICC capable of downloading and installing a profile. The UICC may be embedded in the terminal, and may also be inserted into the terminal so as to be connected to the terminal if the UICC is separated from the terminal. The UICC capable of downloading and installing a profile may be, for example, referred to as a eUICC.

The term "local profile assistant (LPA)" may refer to software or an application installed in a terminal or electronic device so as to control the UICC or eUICC in the terminal or electronic device.

The "event" may be a term collectively referring management/process instructions of a profile download, a remote profile management, or other profiles or a eUICC. The event may be referred to as a remote SIM provisioning operation (RSP operation) or an event record, and each event may be referred to as an event identifier (event ID) corresponding to the event, a matching identifier (matching ID), or data including at least one of an address (FQDN, IP address, or URL) of the opening mediation server (SM-DS) or the profile providing server (SM-DP+) in which the corresponding event is stored, a signature of the opening mediation server (SM-DS) or the profile providing server (SM-DP+), or a digital signature of the opening mediation server (SM-DS) or the profile providing server (SM-DP+).

Data corresponding to an event may be referred to as a "command code." All or part of the procedure using the command code may be referred to as a "command code processing procedure" or "command code procedure," or "local profile assistant application programming interface (LPA API)." Profile download can be interchangeably used with profile installation.

Further, the "event type" may be used as a term indicating whether a specific event is a profile download, remote profile management (for example, deleted, enabled, disabled, replacement, update, and the like), or management/process commands of other profile or eUICC. The event type may be referred to as an operation type (or operationtype), an operation class (or an operationclass), an event request type, an event class, an event request class, and the like. In relation to a predetermined event identifier (eventID or matchingID), a path through which the terminal has obtained the corresponding event identifier (eventID or matchingID) or the usage (eventID source or matchingID source) of the corresponding event identifier may be designated.

The term "profile management" may be roughly divided into "local profile management" and "remote profile management."

The term "local profile management (LPM)" may be referred to as a profile local management, a local management, a local management command, a local command, a local profile management (LPM) package, a profile local management package, a local management package, a local management command package, a local command package, and the like. The LPM may be used for changing the state (enabled, disabled, deleted) of a specific profile through software installed in the terminal, or changing (updating) contents of a specific profile (e.g., profile nickname, profile summary information (profile metadata), etc.)). The LPM may include one or more local management commands. Here, the profiles subject to each local management command may be the same or different according to each local management command.

The term "remote profile management (RPM)" may be referred to as a profile remote management, a remote management, a remote management command, a remote command, a remote profile management package (RPM package), a profile remote management package, a remote management package, a remote management command package, and a remote command package. The RPM may be used for changing a state (enabled, disabled, and deleted) of a specific profile, or changing (updating) contents of a specific profile (for example, profile nickname or profile summary information (profile metadata)). The RPM may include one or more remote management commands, the profiles subject to each remote management command may be the same or different for each remote management command.

The terms "certificate" or a digital certificate may indicate a digital certificate used for mutual authentication based on an asymmetric key including a pair of a public key (PK) and a secret key (SK). Each certificate may include one or more public keys (PK), a public key identifier (PKID) corresponding to each public key, an identifier of a certificate issuer (CI) (certificate issuer ID) issuing the corresponding certificate and a digital signature. The certificate issuer may be referred to as a certification issuer, a certificate authority (CA), or a certification authority, and the like. In the disclosure, the public key (PK) and the public key identifier (PKID) may be used as the same meaning indicating a certificate including a specific public key or a corresponding public key, a part of a certificate including a part of a specific public key or a corresponding public key, a calculation result value (for example, a hash value) of a specific public key or a calculation result value (for example, a hash value) of a certificate including the corresponding public key, a calculation result value (for example, a hash value) of a part of a specific public key or a calculation result value (for example, a hash value) of a part of the certificate including the corresponding public key, or a storage space in which the pieces of data are stored.

According to "certificate chain" or certificate hierarchy, certificates (primary certificate) issued by a "certificate issuer" may be used to issue another certificate (secondary certificate). In addition, if the secondary certificates are used for issuing certificates of a tertiary certificate or higher, the certificate chain or certificate hierarchy may indicate a correlation of the corresponding certificates. Here, a CI certificate used for issuing an initial certificate may be referred to as a root of certificate, an uppermost certificate, a root CI, a root CI certificate, a root CA, a root CA certificate, and the like.

Further, in describing the disclosure, when it is determined that a detailed description of a related known function or configuration may unnecessarily obscure the subject matter of the disclosure, the detailed description thereof will be omitted.

Hereinafter, various embodiments relating to a method and an apparatus for moving and installing a profile between terminals will be described.

FIG. 1 illustrates a method of connecting a terminal to a mobile communication network using a UICC having a fixed profile installed in the terminal according to an embodiment of the disclosure.

As shown in FIG. 1, a UICC 120 may be inserted into the terminal 110. For example, the UICC 120 may be a detachable-type or may be pre-embedded in the terminal.

A fixed profile of a UICC, in which a fixed profile is installed, denotes that "access information" permitting access to a specific mobile operator is fixed. For example, the access information may include an IMSI, which is a subscriber delimiter, and a K value or Ki value required to authentication of a network together with the subscriber identifier.

The terminal 110 according to various embodiments may use the UICC 120 to perform authentication with an authentication processing system (e.g., home location register (HLR) or AuC) of a mobile operator. For example, the authentication process may be an authentication and key agreement (AKA) process. If authentication is successful, the terminal may use a mobile communication service such as a telephone call or mobile data use, by using a mobile communication operator network 130 of the mobile communication system.

Figure 2:
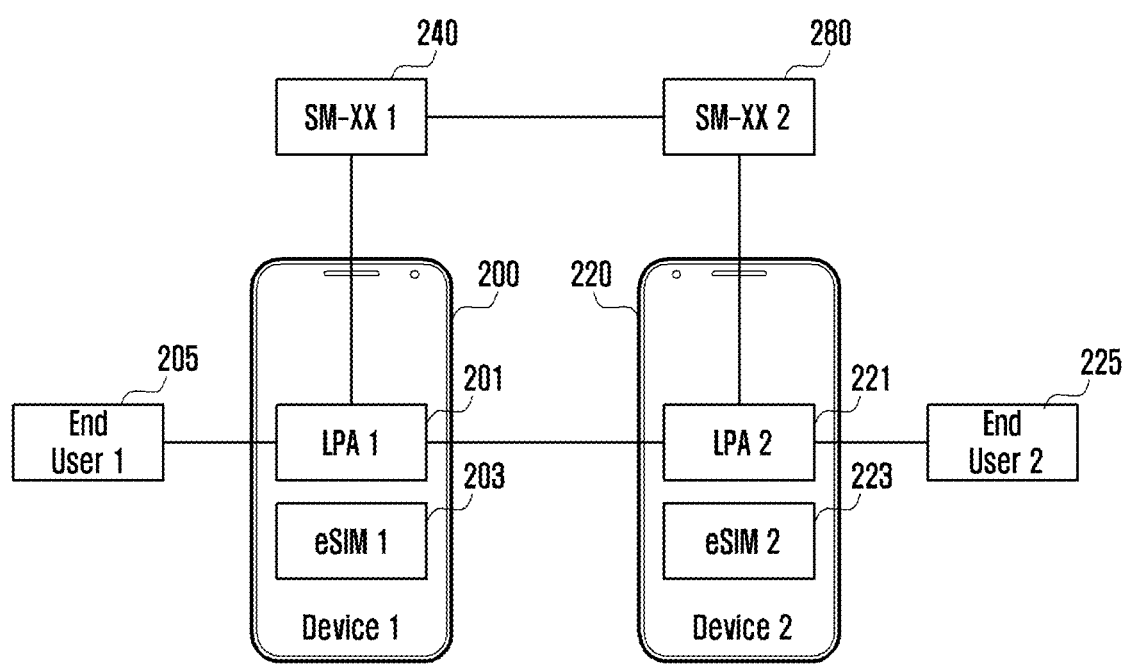
FIG. 2 illustrates an example of a method in which two terminals and a server mutually operate so that a profile or a profile-related service is moved from one terminal to another terminal online or offline according to an embodiment of the disclosure.

FIG. 2 illustrates an example of a method in which two terminals and a server mutually operate in order to move a profile or a profile-related service from one terminal to another terminal according to an embodiment of the disclosure.

As shown in FIG. 2, a first terminal 200 is equipped with a first eSIM 203 and a second terminal 220 is equipped with a second eSIM 223, respectively, and profiles (not shown) may be installed in the first eSIM 203 and the second eSIM 223. In addition, a first LPA 201 and a second LPA 221 may be installed in the first terminal 200 and the second terminal 220, respectively. The first eSIM 203 and the second eSIM 223 may be controlled by the first LPA 201 and the second LPA 221, respectively. A first user 205 and a second user 225 may control profiles installed in the eSIMs (the first eSIM 203 and the second eSIM 223) of respective terminals through the first LPA 201 and the second LPA 221, respectively. Here, the first user 205 and the second user 225 may be the same. In addition, the first LPA 201 and the second LPA 221 may be connected to each other to perform communication. Hereinafter, possible connection methods between LPAs will be described below.

The first LPA 201 of the first terminal 200 may be connected to the first RSP server 240, and the second LPA 221 of the second terminal 220 may be connected to the second RSP server 280. Here, the first RSP server 240 and the second RSP server 280 may be the same. In addition, a case in which each of the first RSP server 240 and the second RSP server 280 is configured as a single server is shown in the drawing, for convenience. However, according to the implementation and embodiments, one or more profile providing servers (SM-DP+) may be included in a server configuration. One or more open mediation servers (SM-DS) that assist in the generation of a connection between a specific profile providing server and the terminal may be included in a server configuration. In addition, although not shown in this figure, one or more RSP servers and/or relay servers may be connected between the first RSP server 240 and the second RSP server 280.

In addition, although not shown in the drawings, each RSP server and/or relay server may be connected to an operator server. When one or more operator servers are included in the configuration, each operator server may be connected to each separate RSP server and/or relay server, and at least one operator server may be connected to the same RSP server and/or relay server.

The configuration of various servers as described above may be briefly represented as a single RSP server in the drawings below. For example, one or more RSP servers and/or relay servers are connected between the first terminal 200 and the second terminal 220, if some or all of the RSP servers and/or relay servers are connected to the operator server, the configuration of various servers existing between the first terminal and the second terminal may be expressed as a single RSP server, and the single RSP server may be referred to as SM-XX in the drawings and embodiments.

Figure 3:
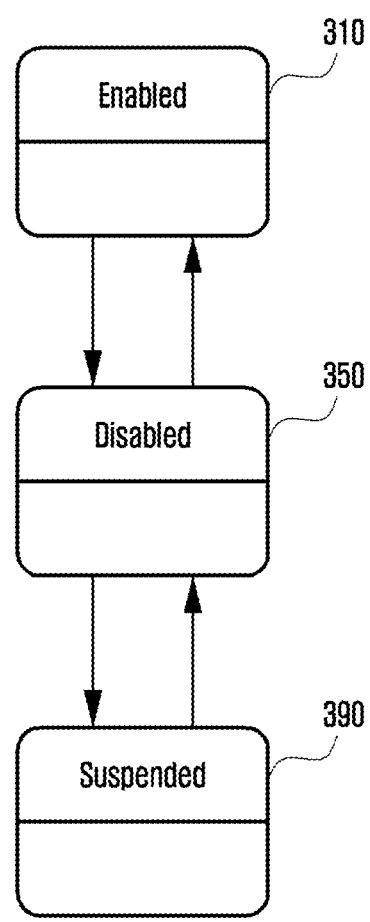
FIG. 3 illustrates possible states of a profile and conditions for transition to each state according to an embodiment of the disclosure.

FIG. 3 illustrates possible states of a profile and conditions for transition to each state according to an embodiment of the disclosure.

Referring to FIG. 3, a profile may be in an enabled state 310. A profile in the enabled state may receive a communication service through a mobile operator that provided the profile.

Referring to FIG. 3, a profile may be in a disabled state 350. A profile in the disabled state may not receive telecommunication services through a mobile operator that provided the profile.

Although there is a difference between the enabled state and the disabled state in that whether a communication service is currently received or not, since the two states may be mutually transitioned according to a user intention as described later, both cases can be regarded as "usable states." That is, since the profile in the enabled or disabled state may use a communication service without the help of the RSP server if the user wants (in a case of disabled state, the communication service can be used if the user changes the disabled state to the enabled state), both the profiles in the enabled and disabled state may be regarded as being in usable states.

Referring to FIG. 3, the profile may be in a suspended state 390. The profile in the suspended state may not be used unless the profile becomes to be in an enabled state or disabled state due to conditions to be described later. That is, as will be described later, the "suspended" state may be regarded as an "unusable" state because the suspended state may not be transitioned to an enabled state or disabled state according to a user intention. That is, the profile in the "suspended" state may be regarded as unusable state because the communication service can be used only with the help and/or approval of the RSP server even if the user wants.

Further, referring to FIG. 3, the profile in an enabled state may become to be in a disabled state according to local profile management or remote profile management. Here, local profile management may be performed through a user input. In addition, although not shown in the drawings, the profile in the enabled state may become to be in a suspended state according to local profile management or remote profile management. The local profile management may be performed through a user input, or may be performed as part of another operation (e.g., a device change operation described in the disclosure).

In addition, referring to FIG. 3, a profile in a disabled state may become to be in an enabled state according to local profile management or remote profile management. Here, local profile management may be performed through a user input. In addition, the profile in the disabled state may become to be in a suspended state according to local profile management or remote profile management. Here, the local profile management may be performed through a user input or may be performed as part of another operation (e.g., a device change operation described in the disclosure).

In addition, referring to FIG. 3, the profile in the suspended state may become to be in a disabled state according to remote profile management. Alternatively, although not shown in the drawing, the profile may become to be in an enabled state according to remote profile management. A process in which the profile in the suspended state becomes to be in a disabled state and/or enabled state according to remote profile management will be described with reference to FIG. 8 or FIG. 9.

The "suspended state" may be a type of "disabled state." For example, a flag or parameter related to "suspended" may be additionally included in the "disabled state." This flag or parameter may be located in the profile or in profile metadata.

Some possible examples of distinguishing between "disabled state" and "suspended state" by using the above flag or parameter are as follows.

(1) For example, if the flag or parameter is additionally included, the profile may be considered as being in a "suspended state", otherwise the profile may be considered as being in a "disabled state."

(2) As another example, even if the flag or parameter is additionally included, a "suspended state" and a "disabled state" may be distinguished according to a value of the flag or the parameter. For example, if the value of the flag or the parameter is 1, it may denote "suspended" state, and if the value of the flag or parameter is 0, it may denote "disabled" state.

The method for distinguishing the "suspended state" and the "disabled state" described above is merely an example, and is not limited thereto.

Figure 4:
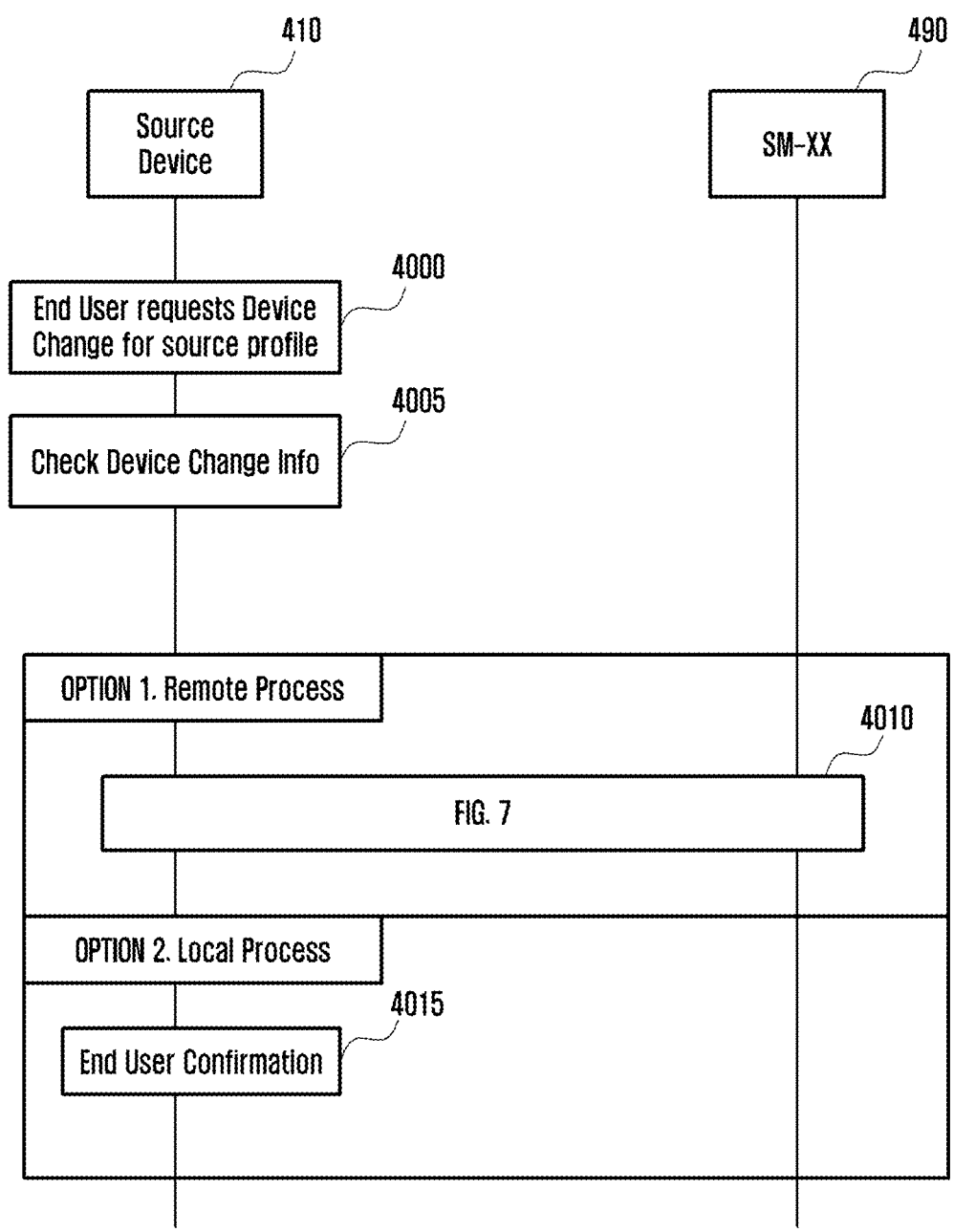
FIG. 4 illustrates a process for preparing a device change according to an embodiment of the disclosure.

FIG. 4 illustrates a process for preparing a device change according to an embodiment of the disclosure.

A source terminal 410 illustrated in FIG. 4 may include at least one LPA and at least one eSIM. An RSP server 490 will be described with reference to FIG. 2.

According to an embodiment, the source terminal 410 may include a pre-installed profile.

In addition, according to an embodiment, the source terminal 410 may include "device change information" related to a pre-installed profile. The "device change information" may be configured by a mobile operator before the device change is performed, and may be stored in the terminal. The above process may be performed if the source terminal 410 has installed the corresponding profile.

The "device change information" may include factors including the following pieces of information:

Device change for the corresponding profile is not supported;

Device change for the corresponding profile is supported, provided that a remote process is performed first in order to acquire a "device change method"; and/or Device change for the corresponding profile is supported. The device change method is included in the device change information. Here, the device change can be performed through a local process without being subject to a remote process.

If the corresponding profile is configured to subject to "remote process," the following pieces of information may be further included in "device change information":

Address of a server to be accessed in order to obtain a device change method;

Whether the source terminal 410 needs to show the eUICC identifier of a target terminal when accessing a server in order to obtain a device change method; and/or Whether a target terminal, which wants to receive a service transferred when accessing a server in order to obtain a device change method, needs to show information required to perform an eligibility check relating to whether the corresponding profile can be downloaded and installed The "device change method (or device change type)," which is pre-stored in the device change information or information that can be obtained through the "remote process" described above, may include all or a part of the following factors:

Information relating to processing of the profile installed in the source terminal. The information may include the following pieces of information:

Delete the profile;

Configure the profile to be in a suspended state; and/or

Do not perform any special work to the profile;

Information relating to, when the source terminal 410 deletes the profile or configures the profile to be in a suspended state, a method of providing a notification of the result of the same to the RSP server. The information may include the following pieces of information:

The source terminal 410 itself needs to provide a notification to the RSP server; and/or The source terminal 410 provides a notification to the RSP server through the target terminal. Here, a "partial notification" method may be used. For details of the partial notification, refer to the descriptions of FIGS. 5 and 6 which will be described later;

Factor indicating whether a request of recovery of the profile, which has been deleted or configured to be in a suspended state, can be made, that is, a recovery request allowance indicator may be included. Examples of the use of the factor may be as follows:

The terminal may request recovery of the deleted profile only if the recovery request allowance indicator indicating whether a request of recovery of the deleted profile can be made is configured as "request allowed". Here, the recovery of the deleted profile may denote a process of reinstalling, in the terminal, a profile that is functionally identical to the deleted profile; and/or The terminal may request recovery of the profile configured to be in the suspended state only if the recovery request allowance indicator indicating whether a request of recovery of the profile configured to be in the suspended state can be made is configured as "request allowed." Here, the recovery of the profile configured to be in a suspended state may denote a process of configuring the profile, which has been configured to be in the suspended state, to be in the enabled state.

Referring to FIG. 4, in step S400, a service subscriber or a terminal user may select a source profile associated with a service that the service subscriber or terminal user wants to transfer to the target terminal among communication services currently being used by the terminal (i.e., the source terminal 410). Here, the source terminal 410 may provide information required for device change to the service subscriber or the terminal user.

Referring to FIG. 4, in step S405, the source terminal 410 may identify "device change information" of a profile associated with a service that the user wants to transfer.

When the "device change information" indicates that the device change for the corresponding profile is not supported, the device change process may be stopped.

If the "device change information" indicates that a remote process needs to be performed first in order to obtain a "device change method" while device change for the corresponding profile is supported, step S410 may be performed.

If the "device change information" indicates that device change for the corresponding profile is supported and the "device change method" is included in the device change information, step S415 may be performed.

Referring to FIG. 4, a remote process may be performed in step S410. The remote process will be described in detail with reference to FIG. 7. In step S410, the source terminal 410 may obtain the "device change method" from the RSP server 490.

Referring to FIG. 4, in step S415, the source terminal 410 may perform a process of receiving a user consent in connection with whether or not to perform a device change and/or a method for performing the device change.

Figure 5:
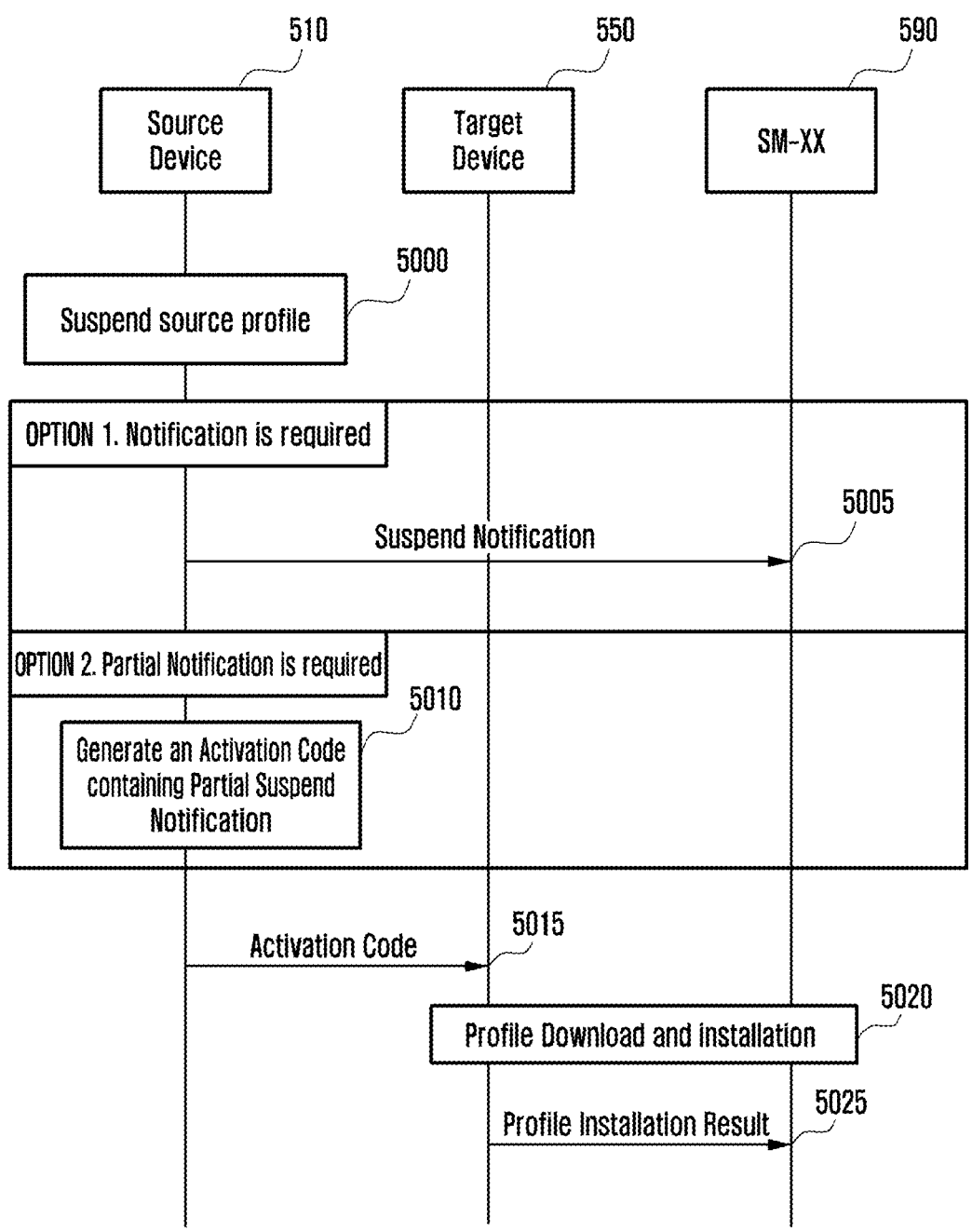
FIG. 5 illustrates an example of a process in which a device change is performed according to an embodiment of the disclosure.
Figure 6:
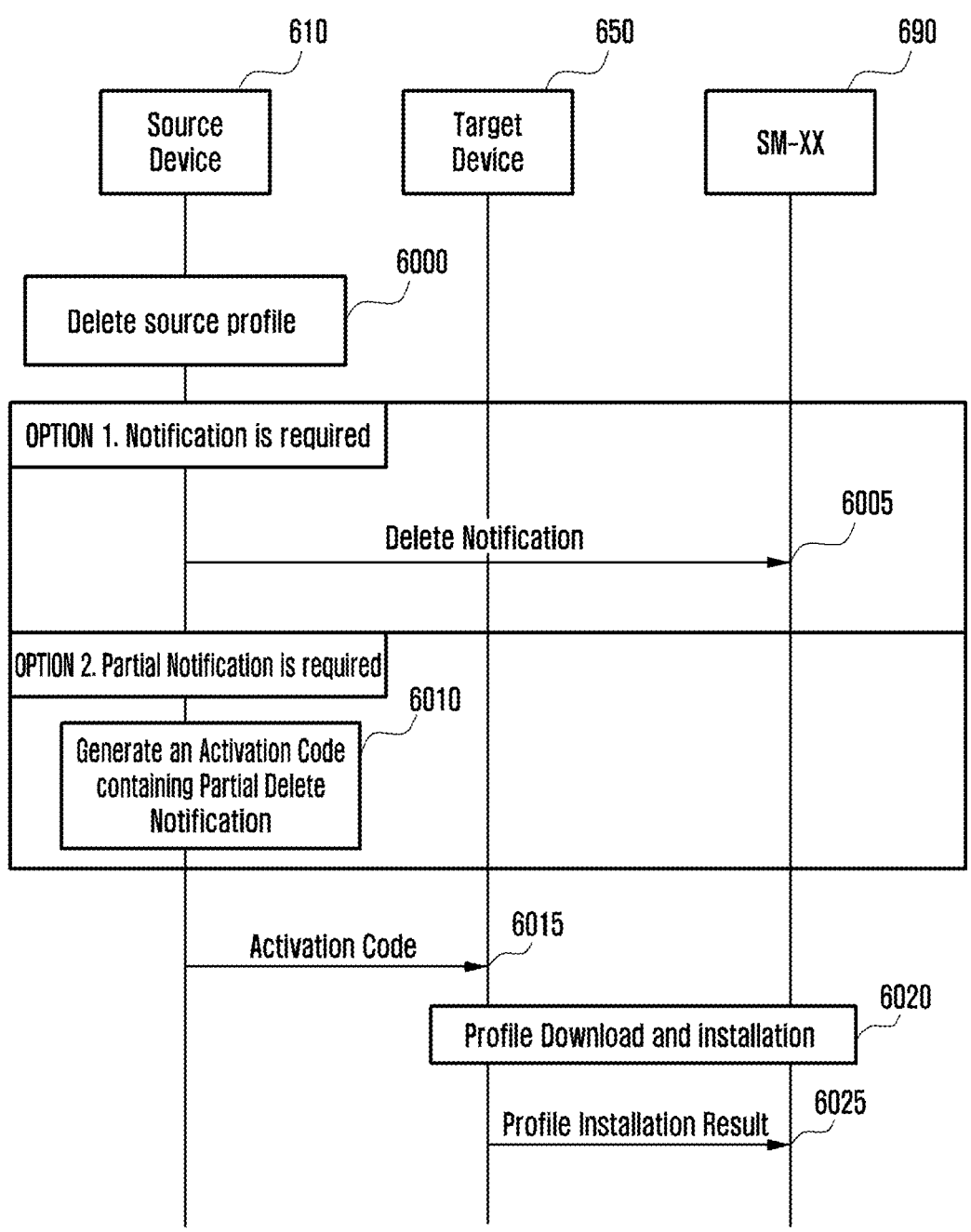
FIG. 6 illustrates another example of a process in which a device change is performed according to an embodiment of the disclosure.
Figure 11:
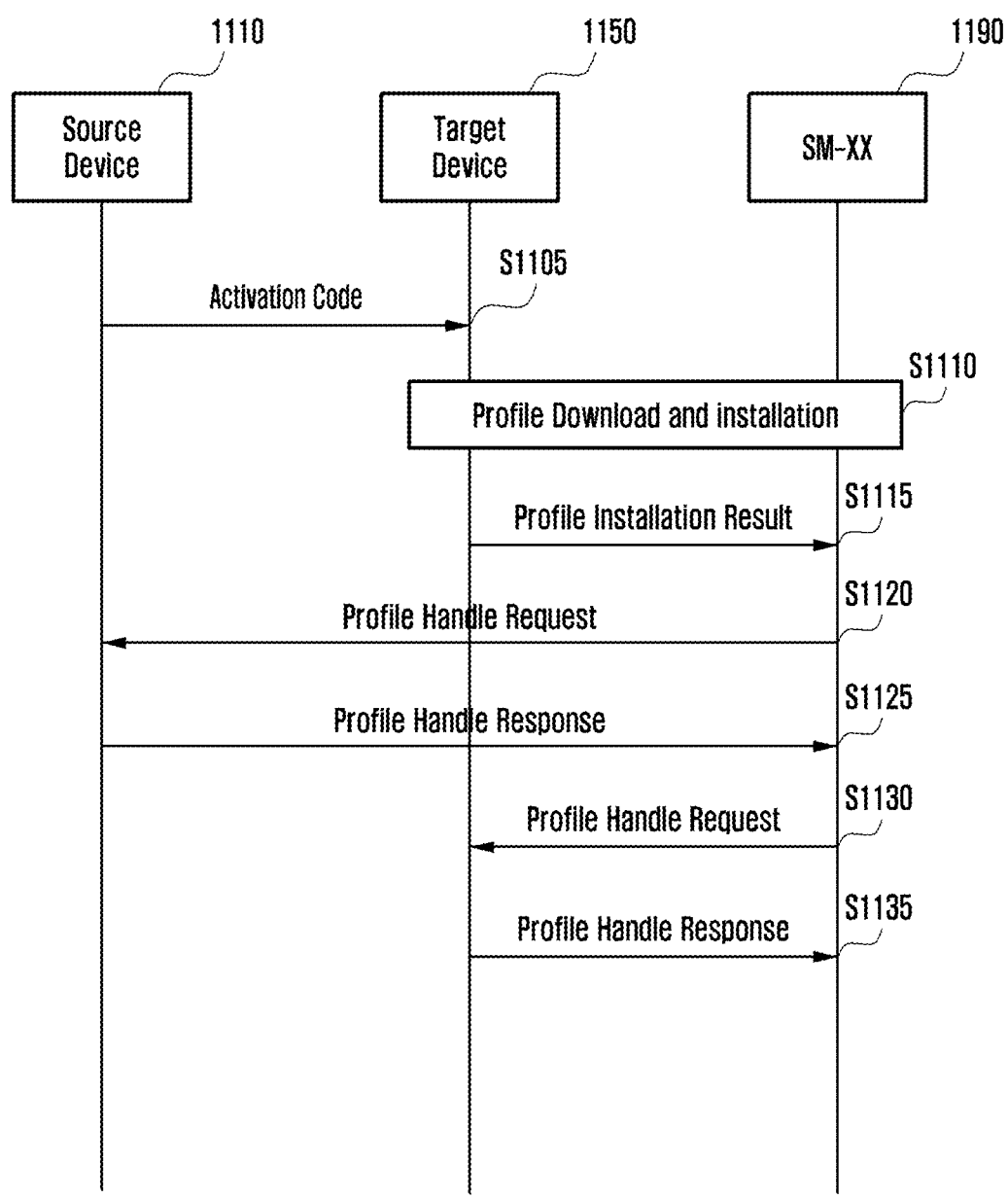
FIG. 11 illustrates still another example of a process in which a device change is performed according to an embodiment of the disclosure.

In connection with information indicating processing of a profile installed in the source terminal 410 of the "device change method" provided from the RSP server through step S410 or the "device change method" that is pre-stored in the terminal and received a user consent through step S415, if the information includes a configuration of deleting the corresponding profile, the process of FIG. 6 may be performed, if the information includes a configuration in which the corresponding profile is configured to be in a suspended state, the process of FIG. 5 may be performed, and if the information includes a configuration that causes a special operation not to be performed for the corresponding profile, the process of FIG. 11 may be performed.

FIG. 5 illustrates an example of a process in which a device change is performed according to an embodiment of the disclosure.

Specifically, the process of FIG. 5 may be performed when the "information relating to processing of a profile installed in the source terminal" of the "device change method" includes a configuration in which the corresponding profile is configured to be in a suspend state.

A source terminal 510 and a target terminal 550 shown in FIG. 5 may each include at least one LPA and at least one eSIM. An RSP server 590 will be described with reference to FIG. 2.

Referring to FIG. 5, in step S500, the source terminal 510 may configure a source profile associated with a service, which is to be transferred to a target terminal 550, to be in a "suspended" state.

Thereafter, according to the contents included in "information relating to, when the source terminal 510 configures the profile to be in a suspended state, a method of providing a notification of the configuration result to the RSP server" of the "device change method," the process may be branched as follows.

If the information includes information configured to indicate that "the source terminal 510 itself needs to provide a notification to the RSP server 590," step S505 may be performed.

If the information includes information configured to indicate that "the source terminal 510 provides a notification to the RSP server 590 through the target terminal 550," step S510 may be performed.

Step S515 may be performed after step S505 or step S510.

Referring to FIG. 5, in step S505, the source terminal 510 may provide, to the RSP server 590, a notification that the source terminal itself has configured the source profile to be in a suspended state. The above process may be performed if the source terminal 510 transmits a suspend notification to the RSP server 590.

The "suspend notification" may include at least one of the following pieces of information:

A notification sequence number;

A factor denoting that the source terminal 510 has configured the profile to be in a suspended state;

An address of the RSP server 590 at which a notification is to be received;

A profile delimiter of the profile configured to be in a suspend state;

A signature value used for digitally signing on all or a part of the pieces of information, by the source terminal 510 (e.g., eUICC mounted on the source terminal); or A series of pieces of certificate information for verifying the signature value.

In step S505, although not shown in the drawing, the source terminal 510 may prepare an activation code to be transmitted to the target terminal 550. Here, the activation code to be transmitted to the target terminal 550 may be included as part of the "device change method." Here, the source terminal 510 may extract an activation code included in the "device change method" and prepare to transmit the activation code to the target terminal 550.

The activation code may include one or more of the following pieces of information:

Information indicating the format of the activation code;

Information (e.g., address and/or OID) of the RSP server 590 to which the target terminal 550 may access to download the profile; and/or Information indicating a profile that the target terminal 550 wants to download (for example, a matching ID associated with a profile to be downloaded, and the matching ID may be generated by the RSP server and connected to the corresponding profile, and thus may be managed by the RSP server).

Referring to FIG. 5, in step S510, the source terminal 510 may generate a "partial suspend notification" to be transmitted to the RSP server 590 through the target terminal 550.

The "partial suspend notification" may include one or more of the following pieces of information:

A notification sequence number;

A factor denoting that the source terminal has configured the profile to be in a suspended state;

An address of the RSP server 590 at which a notification is to be received;

A profile delimiter of the profile configured to be in a suspend state; and/or

A signature value that the source terminal (e.g., eUICC mounted on the source terminal) digitally signs on all or a part of the pieces of information above.

That is, the partial suspend notification may be a series of information excluding a series of pieces of certificate information for verifying the signature value in the suspend notification.

In step S510, although not shown in the drawing, the source terminal 510 may prepare an activation code to be transmitted to the target terminal 550. For example, the source terminal 510 may generate an activation code and prepare to transmit the activation code to the target terminal 550. The activation code may include one or more of the following pieces of information:

Information indicating the format of the activation code;

Information (e.g., address and/or OID) of the RSP server 590 to which the target terminal 550 may access to download the profile;

Information indicating a profile that the target terminal 550 wants to download (for example, a profile delimiter of a profile to be downloaded); and/or A partial suspend notification (e.g., a partial suspend notification transmitted to the target terminal 550 by the source terminal 510 in step S510).

Referring to FIG. 5, in step S515, the source terminal 510 may transmit the activation code prepared in step S505 or S510 to the target terminal 550.

The activation code may include one or more of the following pieces of information:

Information indicating the format of the activation code;

Information (e.g., address and/or OID) of the RSP server 590 to which the target terminal 550 may access to download a profile;

Information indicating a profile that the target terminal 550 wants to download; and/or A partial suspend notification.

The activation code above may be transmitted through one of various methods provided below.

For example, the source terminal 510 may provide information to be transmitted to the target terminal 550 to a user through the UI of the source terminal 510. The user may input the received information by using the UI of the target terminal 550.

Alternatively, the source terminal 510 generates information, which needs to be transmitted to the target terminal 550, in the form of an image (e.g., a QR code) and the generated image is displayed on the screen of the source terminal 510. The user scans the image displayed on the screen of the source terminal by using the target terminal 550 so as to transmit the information to the target terminal 550.

Alternatively, a connection may be established between the source terminal 510 and the target terminal 550 and information may be transmitted using the established connection. Here, the connection established between the source terminal 510 and the target terminal 550 may be a direct device-to-device connection (e.g., NFC, Bluetooth, UWB, WiFi-Direct, LTE device-to-device (D2D), a wireless connection such as 5G D2D, or a wired connection such as cable connection), or may be a remote connection in which a remote server (e.g., a relay server) is located between the source terminal 510 and the target terminal 550.

Referring to FIG. 5, in step S520, the target terminal 550 may download and install a profile from the RSP server 590.

The target terminal 550 may establish a connection with the RSP server 590, and may request from the RSP server 590 a profile by using information included in the activation code (e.g., information indicating a profile that the target terminal 550 wants to download). The RSP server 590 may prepare a profile to be transmitted to the target terminal 550 based on the received information. In the above process, at least one of the following processes may be further included:

Mutual authentication between the target terminal 550 and the RSP server;

Eligibility check, which is performed by the RSP server, of identifying whether the profile to be transmitted can be normally installed and operated in the target terminal 550; or User consent to install the corresponding profile in the target terminal 550.

The RSP server may transmit the prepared profile to the target terminal 550. The target terminal 550 may install the profile, which is received from the RSP server, in the target terminal 550 (e.g., the eUICC of the target terminal 550).

Referring to FIG. 5, in step S525, the target terminal 550 may transmit a profile installation result to the RSP server 590.

FIG. 6 illustrates another example of a process in which a device change is performed according to an embodiment of the disclosure.

Specifically, the process of FIG. 6 may be performed if the "information relating to processing of the profile installed in the source terminal 610" of the "device change method" includes a configuration in which the corresponding profile is configured to be deleted.

A source terminal 610 and a target terminal 650 shown in FIG. 6 may each include at least one LPA and at least one eSIM. An RSP server 690 will be described with reference to FIG. 2.

Referring to FIG. 6, in step S600, the source terminal 610 may delete a source profile associated with a service, which is to be transferred to a target terminal 650.

Thereafter, according to the contents included in "information relating to, when the source terminal 610 has deleted the profile, a method of providing a notification of a profile deletion result to an RSP server 690" of the "device change method," the process may be branched as follows.

If the information includes information configured to indicate that "the source terminal 610 itself needs to provide a notification to the RSP server 690," step S605 may be performed.

If the information includes information configured to indicate that "the source terminal 610 provides a notification to the RSP server 690 through the target terminal 650, step S610 may be performed.

Step S615 may be performed after step S605 or step S610.

Referring to FIG. 6, in step S605, the source terminal 610 may provide, to the RSP server 690, a notification that the source terminal itself has deleted the source profile. The above process may be performed if the source terminal 610 transmits a delete notification to the RSP server 690.

The "delete notification" may include at least one of the following pieces of information:

A notification sequence number;

A factor denoting that the source terminal 610 has deleted the profile;

An address of the RSP server 690 at which a notification is to be received;

A profile delimiter of the deleted profile;

A signature value that the source terminal 610 (e.g., eUICC mounted on the source terminal) digitally signs on all or a part of the pieces of information above; or A series of pieces of certificate information for verifying the signature value In step S605, although not shown in the drawing, the source terminal 610 may prepare an activation code to be transmitted to the target terminal 650. Here, the activation code to be transmitted to the target terminal 650 may be included as part of the "device change method." Here, the source terminal 610 may extract the activation code included in the "device change method" and prepare to transmit the activation code to the target terminal 650.

The activation code may include one or more of the following pieces of information:

Information indicating the format of the activation code;

Information (e.g., address and/or OID) of the RSP server 690 to which the target terminal 650 may access to download the profile; and/or Information indicating a profile that the target terminal 650 wants to download (for example, a matching ID associated with a profile to be downloaded, and the matching ID may be generated by the RSP server and connected to the corresponding profile, and thus may be managed by the RSP server).

Referring to FIG. 6, in step S610, the source terminal 610 may generate a "partial delete notification" to be transmitted to the RSP server 690 through the target terminal 650.

"Partial delete notification" may include one or more of the following pieces of information:

A notification sequence number;

A factor denoting that the source terminal has deleted the profile;

An address of the RSP server at which a notification is to be received;

A profile delimiter of the deleted profile; and/or

A signature value that the source terminal 610 (e.g., eUICC mounted on the source terminal) digitally signs on all or a part of the pieces of information above.

That is, the partial delete notification may be a series of information excluding a series of pieces of certificate information for verifying the signature value in the delete notification.

In step S610, although not shown in the drawing, the source terminal 610 may prepare an activation code to be transmitted to the target terminal 650. For example, the source terminal 610 may generate an activation code and prepare to transmit the activation code to the target terminal 650.

The activation code may include one or more of the following pieces of information:

Information indicating the format of the activation code;

Information (e.g., address and/or OID) of the RSP server 690 to which the target terminal 650 may access to download the profile;

Information indicating a profile that the target terminal 650 wants to download (for example, a profile delimiter of a profile to be downloaded); and/or A partial delete notification (e.g., a partial delete notification transmitted to the target terminal 650 by the source terminal 610 in step S610).

Referring to FIG. 6, in step S615, the source terminal 610 may transmit the activation code prepared in step S605 or S610 to the target terminal 650.

The activation code may include one or more of the following pieces of information:

Information indicating the format of the activation code;

Information (e.g., address and/or OID) of the RSP server to which the target terminal 650 may access to download the profile;

Information indicating a profile that the target terminal 650 wants to download; and/or A partial delete notification.

The activation code may be transmitted through one of various methods provided below.

For example, the source terminal 610 may provide information to be transmitted to the target terminal 650 to a user through the UI of the source terminal 610. The user may input the provided information by using the UI of the target terminal 650.

Alternatively, the source terminal 610 generates information, which needs to be transmitted to the target terminal 650, in the form of an image (e.g., a QR code) and the generated image is displayed on the screen of the source terminal. The user scans the image displayed on the screen of the source terminal 610 by using the target terminal 650 so as to transmit the information to the target terminal 650.

Alternatively, a connection may be established between the source terminal 610 and the target terminal 650 and information may be transmitted using the established connection. Here, the connection established between the source terminal 610 and the target terminal 650 may be a direct device-to-device connection (e.g., NFC, Bluetooth, UWB, WiFi-Direct, LTE device-to-device (D2D), a wireless connection such as 5G D2D, or a wired connection such as cable connection, or may be a remote connection in which a remote server (e.g., a relay server) is located between the source terminal 610 and the target terminal 650.

Referring to FIG. 6, in step S620, the target terminal 650 may download and install a profile from the RSP server 690. The above process may include procedures described below.

The target terminal 650 may establish a connection with the RSP server 690, and may request from the RSP server 690 the profile by using information included in the activation code (e.g., information indicating a profile that the target terminal 650 wants to download). The RSP server 690 may prepare a profile to be transmitted to the target terminal 650 based on the received information. In the above process, at least one of the following processes may be further included:

- Mutual authentication between the target terminal 650 and the RSP server;
- Eligibility check, which is performed by the RSP server, of identifying whether a profile to be transmitted can be normally installed and operated in the target terminal 650; or
- User consent to install the corresponding profile in the target terminal 650.

The RSP server may transmit the prepared profile to the target terminal 650. The target terminal 650 may install the profile, which is received from the RSP server, in the target terminal 650 (e.g., the eUICC of the target terminal).

Referring to FIG. 6, in step S625, the target terminal 650 may transmit a profile installation result to the RSP server 690.

Figure 7:
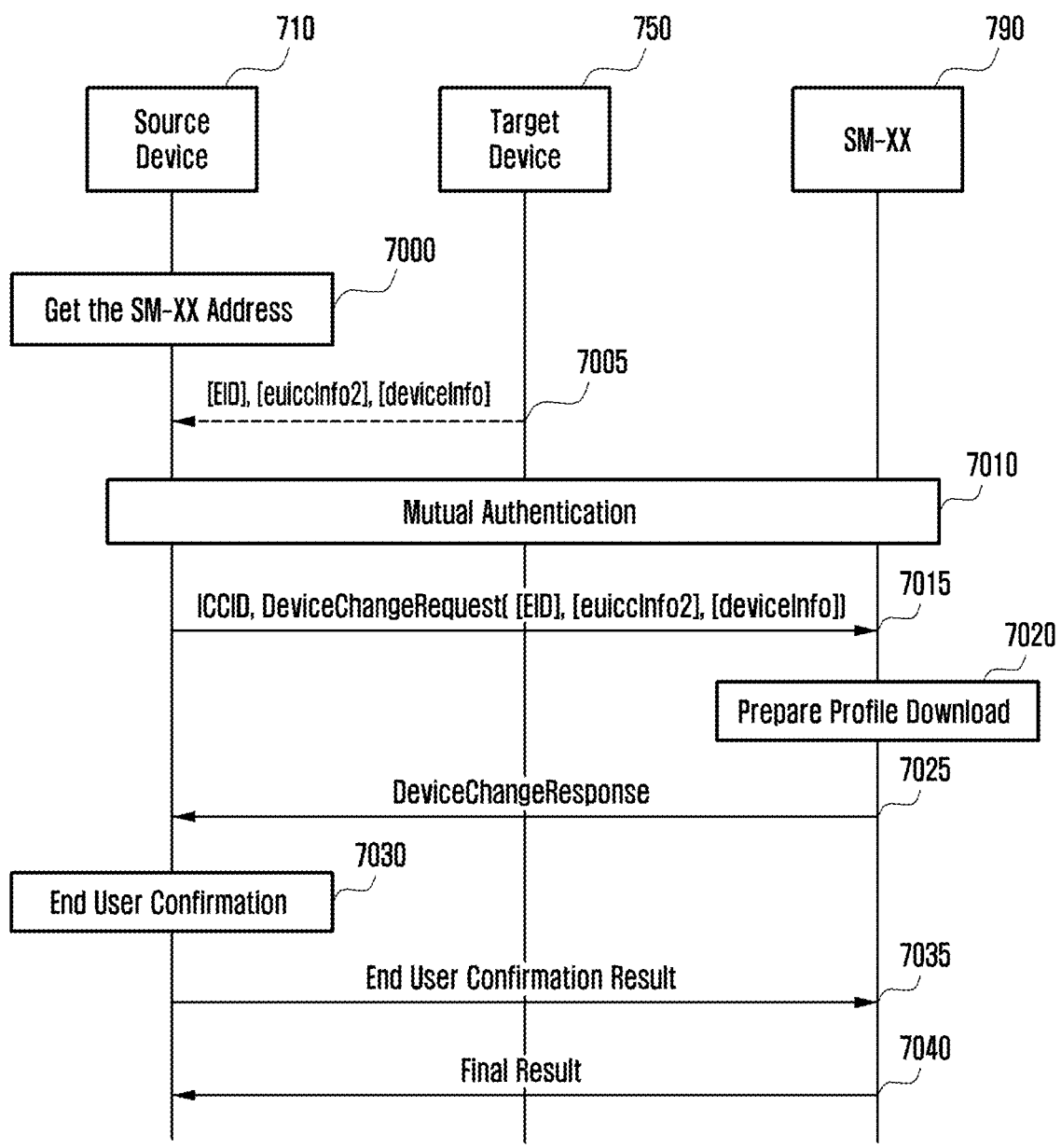
FIG. 7 illustrates a detailed procedure of step S410 provided in FIG. 4 according to an embodiment of the disclosure.

FIG. 7 illustrates a detailed procedure of step S410 provided in FIG. 4 according to an embodiment of the disclosure.

A source terminal 710 and a target terminal 750 illustrated in FIG. 7 may each include at least one LPA and at least one eSIM. An RSP server 790 will be described with reference to FIG. 2.

Referring to FIG. 7, in step S700, the source terminal 710 may acquire the address of the RSP server 790 to which an access may be tried in order to acquire a "device change method." The address of the RSP server 790 to which the source terminal may try to access may be included in "device change information."

Referring to FIG. 7, the following process may be performed in step S705.

If the "device change information" includes information configured to indicate that the source terminal 710 needs to show the eUICC identifier of the target terminal 750 when accessing a server in order to obtain a device change method, the source terminal 710 may obtain the eUICC identifier of the target terminal 750. This process may be performed by receiving the eUICC identifier of the target terminal 750 from the target terminal 750 by the source terminal 710.

If the "device change information" includes information configured to indicate that, when the source terminal 710 accesses a server in order to obtain a device change method, the target terminal 750 needs to show information required for performing eligibility check relating to whether a profile associated with a service, which the target terminal wants to receive, can be downloaded and installed, the source terminal 710 may obtain information of the target terminal 750 required for the eligibility check. This process may be performed by receiving from the target terminal 750, eUICC information (euiccinfo2) of the target terminal 750 and information (deviceinfo) such as LPA and modem, by the source terminal 710.

Referring to FIG. 7, mutual authentication may be performed between the source terminal 710 and the RSP server 790 in step S710. The mutual authentication process may include one or more of the following example processes.

In one example, the mutual authentication process may include a certificate negotiation process that needs to be performed in order for the source terminal 710 and the RSP server 790 to perform communication. For example, the source terminal 710 may transmit, to the RSP server 790, pieces of certificate information that can be used to verify the RSP server 790 and/or pieces of certificate information that can be used by the RSP server 790 in order to verify the source terminal 710. Upon receiving this information, the RSP server 790 may select pieces of certificate information to be used by the source terminal 710 to verify the RSP server 790 and/or pieces of certificate information that can be used by the RSP server 790 in order to verify the source terminal 710. Here, the pieces of certificate information selected by the RSP server 790 may be transmitted to the source terminal 710. Through this process, the source terminal 710 and the RSP server 790 may acquire pieces of certificate information for mutual authentication. Here, the certificate information may be a certificate, information included in the certificate, and/or a series of information that may refer to the certificate.

In another example, the source terminal 710 may transmit a predetermined random number (eUICC challenge) value generated by the source terminal 710 itself to the RSP server 790. The RSP server 790 may digitally sign the received random number value and then transmit the signature value to the source terminal 710. The source terminal 710 may verify the received signature value so as to authenticate the RSP server 790.

In yet another example, the RSP server 790 may transmit a random number (server challenge) value generated by itself to the source terminal 710. The source terminal 710 may digitally sign the received random number value and then transmit the signature value to the RSP server 790. The RSP server 790 may verify the received signature value so as to authenticate the source terminal 710.

In yet another example, during communication between the RSP server 790 and the source terminal 710, an ID (transaction ID) for managing a session may be exchanged. For example, the RSP server 790 may generate a transaction ID and transmit the value thereof to the source terminal 710.

Here, the digital signature value of the RSP server 790 may be added to verify the reliability and integrity of the transaction ID.

In yet another example, the RSP server 790 and the source terminal 710 may exchange their own IDs. For example, the RSP server 790 may provide its own object identifier (OID) to the source terminal 710. As another example, the source terminal 710 may provide its own eUICC identifier to the RSP server 790.

Referring to FIG. 7, the following process may be performed in step S715.

The source terminal 710 may transmit, to the RSP server 790, a profile delimiter of a profile associated with a service to be transferred to the target terminal 750.

The source terminal 710 may transmit a message requesting service transfer, that is, a device change request, to the RSP server 790. The devicechangerequest may include a eUICC identifier of the target terminal 750. The devicechangerequest may include eUICC information (euiccinfo2) of the target terminal 750 and information (deviceinfo) such as an LPA and a modem.

Referring to FIG. 7, in step S720, the RSP server 790 may prepare a profile to be transmitted to the target terminal 750.

In the process of preparing the profile, if it is required to perform an eligibility identify to identify whether the corresponding profile can be normally installed and operated in the target terminal 750, the RSP server may perform the eligibility check using the eUICC information (euiccinfo2) of the target terminal 750 and the information (deviceinfo) such as LPA and modem, which are received in step S715.

If it is required to match the profile with the eUICC identifier of the target terminal 750 in the process of preparing the profile, the RSP server 790 may perform the matching process by using the eUICC identifier of the target terminal 750 received in step S715.

Referring to FIG. 7, in step S725, the RSP server 790 may transmit a response message to the request for device change, that is, a device change response, to the target terminal 750. The device change response may include a "device change method." A description of the "device change method" will be described with reference to FIG. 4. The device change response may further include a message that a mobile operator wants to provide, to a user, a notification regarding the device change.

Referring to FIG. 7, in step S730, the source terminal 710 may receive user consent in relation to device change. If the message that a mobile operator wants to provide, to a user, a notification regarding the device change is transmitted in step S725, the message may be provided to the user in the process of obtaining a user's consent.

Referring to FIG. 7, in step S735, the source terminal 710 may transmit a result of user consent to the RSP server 790.

The result of user consent may include one of the following messages:

User consents to device change;
User does not consent to device change;
User defers device changes; and/or
No user response.

Referring to FIG. 7, the following process may be performed in step S740.

If the user consents to device change, the RSP server 790 may transmit, to the source terminal 710, a success message indicating continuing the device change process.

When the user does not consent to the device change, the RSP server 790 may cancel preparation for downloading the profile prepared in step S720.

Figure 8:
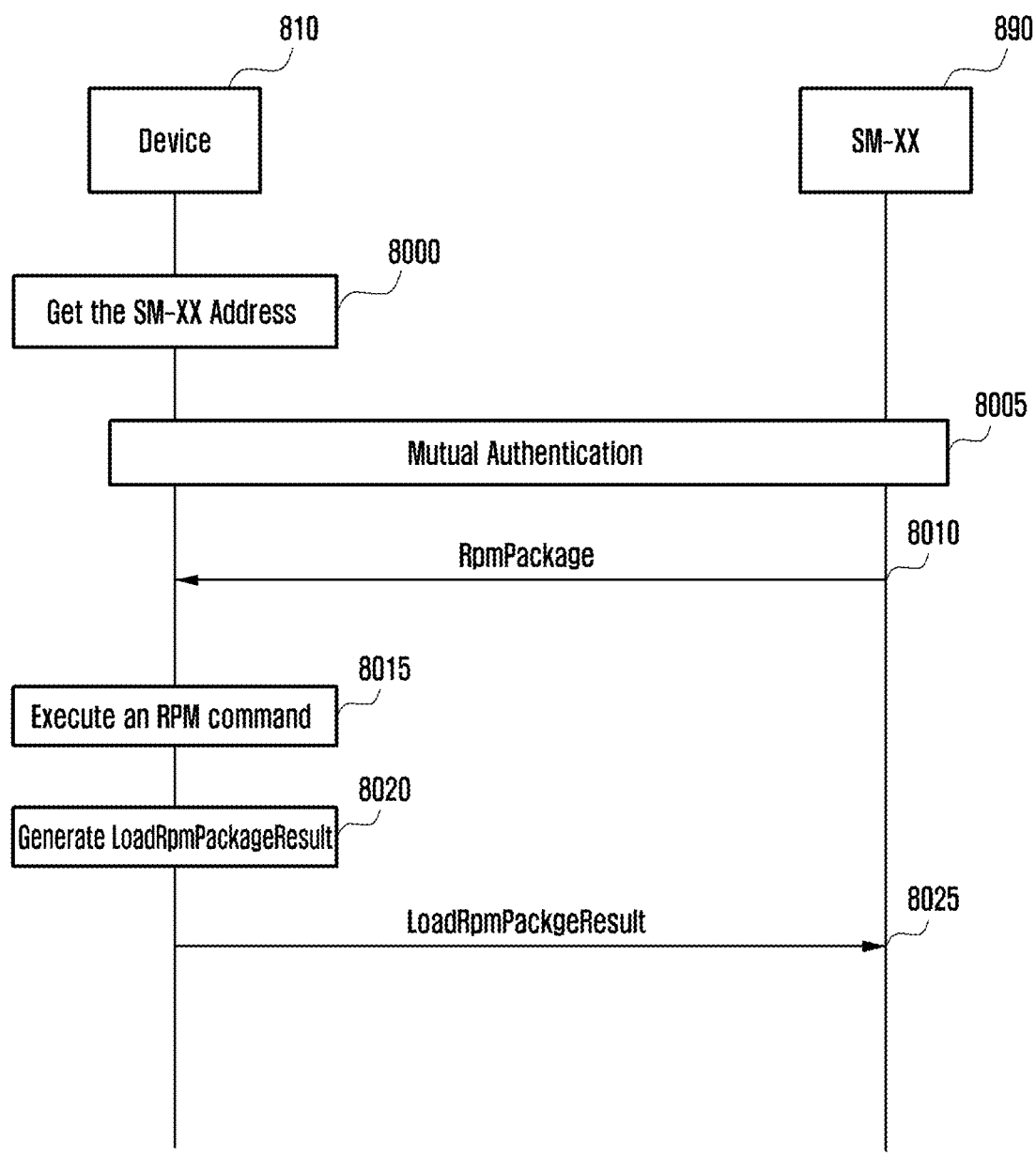
FIG. 8 illustrates a method of making a profile to be in a "suspended" state or recovering the "suspended" profile to a usable state through remote profile management according to an embodiment of the disclosure.

FIG. 8 illustrates a method for making a profile to be in a "suspended" state or recovering the "suspended" profile to a usable state through remote profile management according to an embodiment of the disclosure.

A terminal 810 shown in FIG. 8 may include at least one LPA and at least one eSIM. An RSP server 890 will be described with reference to FIG. 2.

Referring to FIG. 8, in step S800, the terminal 810 may acquire the address of the RSP server 890 from which a remote profile management package (RPMpackage) is to be received. The address of the RSP server to be accessed by the terminal 810 may be pre-stored in the terminal 810, or the terminal 810 may access another RSP server (e.g., another open mediation server (SM-DS)) to acquire the address of the RSP server to which the terminal may access in order to receive a remote profile management package (RPMpackage).

Referring to FIG. 8, mutual authentication may be performed between the terminal 810 and the RSP server 890 in step S805. This mutual authentication process may include one or more of the following example processes.

In one example, the mutual authentication process may include a certificate negotiation process that needs to be performed in order for the terminal 810 and the RSP server 890 to perform communication. For example, the terminal 810 may transmit, to the RSP server 890, pieces of certificate information that can be used to verify the RSP server 890 and/or pieces of certificate information that can be used by the RSP server 890 in order to verify the terminal 810. Upon receiving this information, the RSP server 890 may select pieces of certificate information to be used by the terminal 810 to verify the RSP server 890 and/or pieces of certificate information that can be used by the RSP server 890 in order to verify the terminal 810. Here, the pieces of certificate information selected by the RSP server 890 may be transmitted to the terminal 810. Through this process, the terminal 810 and the RSP server 890 may acquire pieces of certificate information for mutual authentication. Here, the certificate information may be a certificate, information included in the certificate, and/or a series of information that may refer to the certificate.

In another example, the terminal 810 may transmit a predetermined random number (eUICC challenge) value generated by the terminal 810 itself to the RSP server 890. The RSP server 890 may digitally sign the received random number value and then transmit the signature value to the terminal 810. The terminal 810 may verify the received signature value so as to authenticate the RSP server 890.

In yet another example, the RSP server 890 may transmit a random number (server challenge) value generated by itself to the terminal 810. The terminal 810 may digitally sign the received random number value and then transmit the signature value to the RSP server 890. The RSP server 890 may verify the received signature value so as to authenticate the terminal 810.

In yet another example, during communication between the RSP server 890 and the terminal 810, an ID (transaction ID) for managing a session may be exchanged. For example, the RSP server 890 may generate a transaction ID and transmit the value thereof to the terminal 810. Here, the digital signature value of the RSP server 890 may be added to verify the reliability and integrity of the transaction ID.

In yet another example, the RSP server 890 and the terminal 810 may exchange a profile identifier of a profile to perform remote profile management in the disclosure. For example, the terminal 810 may transmit a profile identifier for remote profile management to the RSP server 890. Here, the profile identifier may be transmitted together with the digital signature value of the terminal 810 to ensure reliability and integrity.

In yet another example, the RSP server 890 and the terminal 810 may exchange their own IDs. For example, the RSP server 890 may provide its own object identifier (OID) to the terminal 810. As another example, the terminal 810 may provide its own eUICC identifier to the RSP server 890.

Referring to FIG. 8, the following process may be performed in step S810.

The RSP server 890 may identify whether there is a remote profile management package (RPMpackage) to be transmitted to the terminal 810 by using the received eUICC identifier and/or the profile delimiter of the terminal 810. The RPMpackage may include one or more of the following remote profile management commands (RPMcommands):

Enable the profile;
Disable the profile;
Make the profile to be in a suspended state; and/or
Recover the profile.

The RSP server 890 may transmit the RPMpackage to the terminal 810.

Referring to FIG. 8, in step S815, the terminal 810 may perform the received remote profile management command.

If the terminal 810 receives a remote profile management command indicating "making the profile to be in a suspended state," one of the following processes may be performed. If the corresponding profile is in a disabled state, the terminal may change the profile to be in a suspended state. If the corresponding profile is in an enabled state, the terminal may change the profile to be in a suspended state. Alternatively, if the corresponding profile is in an enabled state, the terminal may make the profile to be in a disabled state and then change the profile to be in a suspended state.

If the terminal 810 receives a remote profile management command indicating "enabling the profile," one of the following processes may be performed. If the corresponding profile is in a disabled state, the terminal may change the profile to be in an enabled state. If the corresponding profile is in a suspended state, the terminal may change the profile to be in an enabled state. Alternatively, if the corresponding profile is in a suspended state, the terminal may make the profile to be in a disabled state and then change the profile to be in an enabled state.

If the terminal 810 receives a remote profile management command indicating "disabling the profile," one of the following processes may be performed. If the corresponding profile is in an enabled state, the terminal may change the profile to be in a disabled state. If the corresponding profile is in a suspended state, the terminal may change the profile to be in a disabled state.

If the terminal 810 receives a remote profile management command indicating "recovering the profile," one of the following processes may be performed. The terminal 810 may change the profile in a suspended state to be in a disabled state. The terminal 810 may change the profile in a suspended state to be in an enabled state. The terminal 810 may change the profile in a suspended state to be in a disabled state and then change the profile to be in an enabled state.

Referring to FIG. 8, in step S820, the terminal 810 may generate a remote profile management execution result (loadRPMpackageresult) based on a result of the performed remote profile management command. The "remote profile management performance result" may include one or more of the following pieces of information:

A profile delimiter of the profile for which the remote profile management command is performed;
Remote profile management commands that have been performed;
The profile has been enabled;
The profile has been disabled;
The profile has been changed to be in a suspended state; and/or
The profile has been recovered.

Referring to FIG. 8, in step S825, the terminal 810 may transmit the "remote profile management performance result" generated in step S820 to the RSP server 890.

The process of remote profile management described above, in particular, the process of recovering, enabling, and/or disabling the profile in a suspended state (for convenience, the "process of recovering, enabling, and/or disabling the profile in a suspended state" may be collectively referred later to as "the process of recovering a profile") may be used if the profile, which has been suspended in step S500 of FIG. 5, needs to be recovered due to an error in step S520. That is, if, in step S520 of FIG. 5, an error occurs and profile installation is not normally performed in the target terminal, the disclosure of FIG. 8 described above may be performed in order for the source terminal to make the profile, which has been in a suspended state (i.e., in step S500), to be in a usable state. More detailed information relating thereto is as follows.

(1) Step in which the RSP server prepares for recovery.

In step S520 of FIG. 5, if an error occurs while the target terminal 550 downloads and/or installs a profile from the RSP server 590, the RSP server 590 may prepare a remote profile management package (RPMpackage) to be transmitted to the source terminal 510 and here, the RPMpackage may include one or more of the following remote profile management commands (RPMcommands) in order to recover the profile:

Enable the profile;
Disable the profile; and/or
Recover the profile.

Here, conditions under which the RSP server prepares a remote profile management package (RPMpackage) to be transmitted to the source terminal may be at least one of the cases listed below:

An error occurring when downloading a profile;
  Mutual authentication failed between the target terminal and the RSP server in step S520;
  Eligibility check failed in step S520;
  Profile installation rejected by a user in step S520; or
A permanent error has occurred when installing a profile.

The permanent error occurring when installing a profile refers to a type of an error in which the profile installation is not possible even if the target terminal retries to install the corresponding profile.

A temporary error occurring when installing a profile refers to a type of error in which the profile installation may be possible when the target terminal retries to install the corresponding profile. A possible temporary error when installing a profile may be one of the following examples:

Install failed due to insufficient memory: installation error due to insufficient installation space in eUICC; or
Install failed due to interruption: installation error due to unexpected interruption in performing operation.

If the above-described temporary error occurs in step S520, one of the following processes may be performed:

The RSP server does not prepare RPMpackage to be transmitted to the source terminal;

RSP server prepares RPMpackage to be transmitted to the source terminal; or

Installation of the profile on the target terminal is tried as many times as the allowed retry limits, and if the profile installation fails after retrying as many times as the allowed retry limits, the RSP server prepares the RPM-package to be transmitted to the source terminal.

After the RSP server prepares the RPMpackage to be transmitted to the source terminal through the above process, the RSP server may perform one or more of the following operations.

Save the RPMpackage to be transmitted to the source terminal; and/or

Register, in another RSP server (another open mediation server (SM-DS)), an indication that there is RPMpackage to be transmitted to the source terminal.

(2) Step in which the source terminal performs recovery.

Thereafter, as shown in FIG. 8, the "process of recovering the profile in a suspended state" is performed through remote profile management, and thus the profile that has been suspended through step S500 is recovered in the source terminal 510 (i.e., the profile becomes to be in an enabled or disabled state to thereby be in a usable state).

Here, a case in which step S800 is started among the processes shown in FIG. 8 may be one of the following:

The source terminal 810 starts performing step S800 without an external input;

The source terminal 810 starts performing step S800 according to a profile configuration;

The source terminal 810 starts to periodically perform step S800;

The source terminal 810 receives an input from a user and starts performing step S800. For example, if the user expresses his/her intention to recover the corresponding profile through the UI provided by the source terminal, step S800 starts to be performed; or The source terminal 810 receives an input from the RSP server and starts performing step S800.

Figure 9:
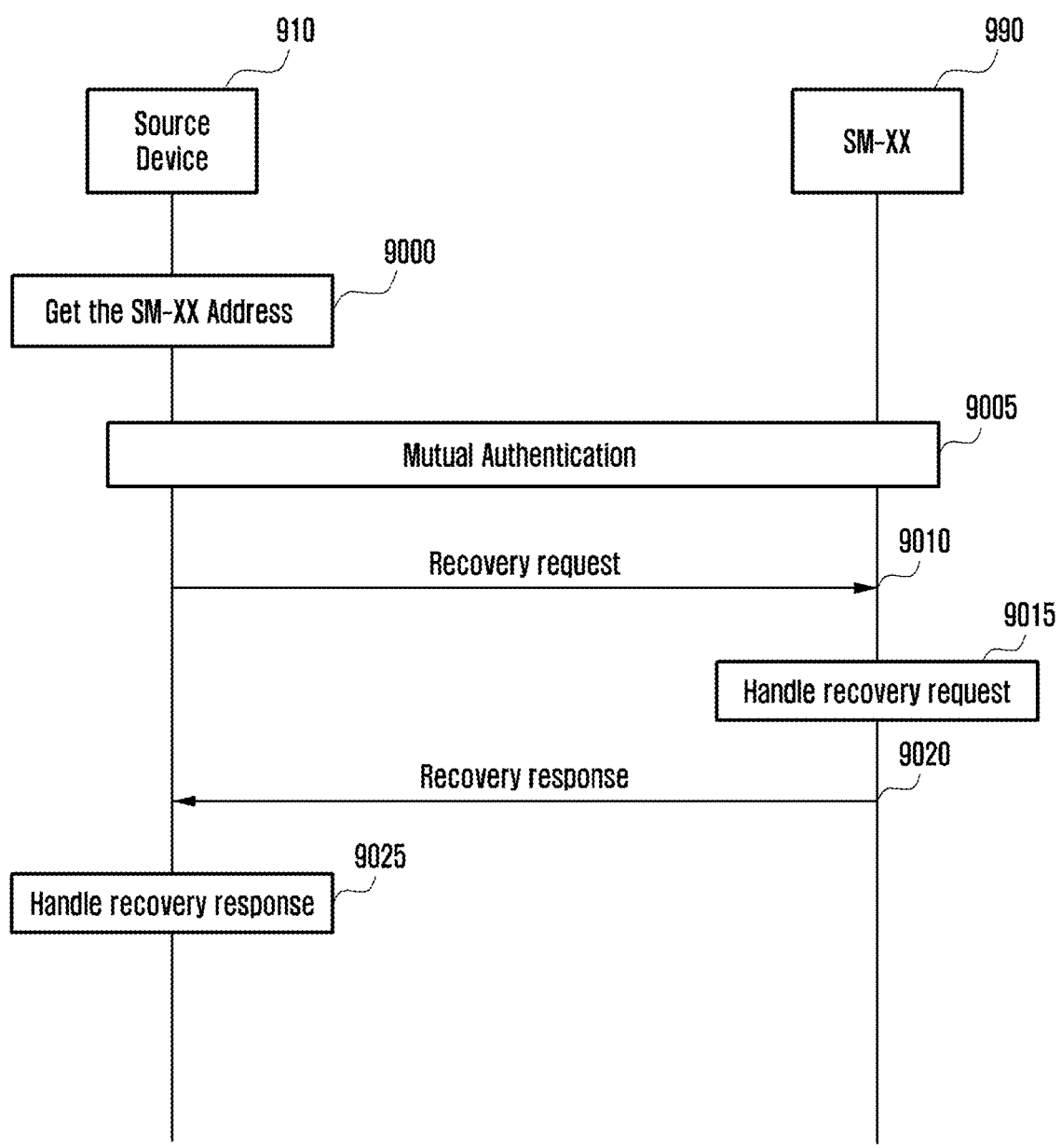
FIG. 9 illustrates another method of recovering a "suspended" profile to a usable state according to an embodiment of the disclosure.

FIG. 9 illustrates still another method for recovering a "suspended" profile to a usable state according to an embodiment of the disclosure. In FIG. 9, recovering a profile in a suspended state to a usable state may denote an operation of "enabling" or "disabling" the state of a profile. The process of "recovering the profile in a suspended state to a usable state" may be briefly described as the process of "recovering the profile."

A source terminal 910 shown in FIG. 9 may include at least one LPA and at least one eSIM. For an RSP server 990, reference will be made to the description of FIG. 2.

In FIG. 9, the process of recovering the profile may be performed after the process of FIG. 5. If an error occurs in step S520 of FIG. 5 and thus profile recovery is needed, the profile that has been suspended in step S500 may be used. That is, if an error occurs in step S520 of FIG. 5, profile installation is not normally performed and cannot be used in the target terminal, in order for the source terminal to make the profile that has been in a suspended state (that is, in step S500) to be in a usable state, the following procedure can be performed.

Referring to FIG. 9, the following process may be performed in step S900.

The source terminal 910 may acquire the address of the RSP server 990 to be accessed in order to request profile recovery. The address of the RSP server to which the source terminal 910 may access may be pre-stored in the source terminal 910, and the source terminal 910 may access another RSP server (e.g., another open mediation server (SM-DS)) to acquire the address of the RSP server to be accessed in order to perform recovery.

Here, conditions under which the source terminal starts to perform step S900 may be one of the following:

The source terminal 910 automatically starts performing step S900;

The source terminal 910 receives an input from a user and starts performing step S900. For example, when the user expresses his/her intention to recover the corresponding profile through the UI provided by the source terminal, step S900 starts to be performed; or The source terminal 910 receives an input from the RSP server (e.g., the RSP server indicated by reference numeral 990 or another RSP server) and starts performing step S900.

Referring to FIG. 9, mutual authentication may be performed between the source terminal 910 and the RSP server 990 in step S905. The mutual authentication process may include one or more of the following example processes.

In one example, the mutual authentication process may include a certificate negotiation process that needs to be performed in order for the source terminal 910 and the RSP server 990 to perform communication. For example, the source terminal 910 may transmit, to the RSP server 990, pieces of certificate information that can be used to verify the RSP server 990 and/or pieces of certificate information that can be used by the RSP server 990 in order to verify the source terminal 910. Upon receiving this information, the RSP server 990 may select pieces of certificate information to be used by the source terminal 910 to verify the RSP server 990 and/or pieces of certificate information that can be used by the RSP server 990 in order to verify the source terminal 910. Here, the pieces of certificate information selected by the RSP server 990 may be transmitted to the source terminal 910. Through this process, the source terminal 910 and the RSP server 990 may acquire pieces of certificate information for mutual authentication. Here, the certificate information may be a certificate, information included in the certificate, and/or a series of information that may refer to the certificate.

In another example, the source terminal 910 may transmit a predetermined random number (eUICC challenge) value generated by the source terminal 910 itself to the RSP server 990. The RSP server 990 may digitally sign the received random number value and then transmit the signature value to the source terminal 910. The source terminal 910 may verify the received signature value so as to authenticate the RSP server 990.

In yet another example, the RSP server 990 may transmit a predetermined random number (server challenge) value generated by itself to the source terminal 910. The source terminal 910 may digitally sign the received random number value and then transmit the signature value to the RSP server 990. The RSP server 990 may verify the received signature value so as to authenticate the source terminal 910.

In yet another example, during communication between the RSP server 990 and the source terminal 910, an ID (transaction ID) for managing a session may be exchanged. For example, the RSP server 990 may generate a transaction ID and transmit the value thereof to the source terminal 910. Here, the digital signature value of the RSP server 990 may be added to verify the reliability and integrity of the transaction ID.

In yet another example, the RSP server 990 and the source terminal 910 may exchange their own IDs. For example, the RSP server 990 may provide its own object identifier (OID)

to the source terminal 910. As another example, the source terminal 910 may provide its own eUICC identifier to the RSP server 990.

Referring to FIG. 9, the following process may be performed in step S910.

The source terminal 910 may transmit a request for profile recovery to the RSP server 990. Here, the source terminal 910 may transmit a profile delimiter of a profile for which recovery is to be requested to the RSP server 990.

Referring to FIG. 9, the following processes may be performed in step S915.

The RSP server 990 may perform one or more of the following processes based on the request message received in step S910:

- By using the received "eUICC identifier of the source terminal" and the "profile delimiter" of the profile for which recovery is requested, it is possible to identify that the source terminal has been a valid user of the corresponding profile; and/or
- It is possible to identify whether the profile for which recovery is requested can be recovered in the source terminal that has requested profile recovery.

A detailed description of the process of determining "whether the recovery-requested profile can be recovered in the source terminal that has requested profile recovery" is as follows.

In step S520 of FIG. 5, if an error occurs in the process of downloading and/or installing a profile by the target terminal 550, the RSP server 990 may determine that recovery of the corresponding profile is possible at the source terminal 910.

Here, the "error occurring in the process of profile download and/or installation by the target terminal" when the RSP server 990 determines that recovery of the corresponding profile is possible may include at least one of the cases described below:

- An error occurring when downloading the profile;
  - Mutual authentication failed between the target terminal and the RSP server in step S520;
  - Eligibility check failed in step S520; and/or
  - Profile installation rejected by a user in step S520;
- Permanent error occurring when installing the profile; or
- A case in which a temporary error, occurring at the time of profile installation, exceeds the number of allowed retry limits. That is, a case in which, when a temporary error occurs, profile installation can be tried by the RSP server and the target terminal as many times as the allowed retry limits (here, the number of allowed retry limits is a positive integer value including 0), but the profile installation fails due to exceeding the allowed retry limits.

A permanent error occurring at the time performing profile installation refers to a type of error in which the profile installation is not possible even if the target terminal retries to install the corresponding profile.

A temporary error occurring at the time of performing profile installation refers to a type of error in which the profile installation may be possible when the target terminal retries installation of the corresponding profile. A possible temporary error when performing profile installation may be one of the following examples:

- Install failed due to insufficient memory: installation error due to insufficient installation space in eUICC; or
- Install failed due to interruption: installation error due to unexpected interruption in performing operation.

After step S915, steps S920 to S925 may be performed in various ways as follows.

(1) A case in which it is determined that the requested profile recovery is impossible.

Referring to FIG. 9, in step S920, the RSP server 990 may provide, to the source terminal 910, a notification that the profile recovery requested in step S910 is impossible.

(2) A case in which it is determined that the requested profile recovery is possible (Scenario 1).

Referring to FIG. 9, in step S920, the RSP server 990 may provide, to the source terminal 910, a notification that the profile recovery requested in step S910 is possible.

For example, a message transmitted from the RSP server to the source terminal may include one or more of the following pieces of information:

- A profile delimiter of a profile to be recovered;
- Information of the RSP server (e.g., OID indicating the RSP server);
- A eUICC identifier of the source terminal;
- A flag or parameter indicating that recovery of the corresponding profile is possible. The flag and parameter may be configured as specific values;
- A method for recovering the corresponding profile. For example, the method indicates that the profile needs to be configured to be "enabled" state or "disabled" state; and/or
- A signature value the RSP server 990 digitally signs on all or a part of the message.

Referring to FIG. 9, the following process may be performed in step S925.

The source terminal 910 may identify a message received in step S920. The source terminal may verify that the digital signature of the received message is valid. The source terminal may identify the content of the received message. That is, the source terminal may identify whether the content of the received message is correct, and may identify an operation that needs to be performed by the source terminal itself.

The source terminal 910 may recover the corresponding profile. That is, the source terminal may make the corresponding profile to be usable. For example, the source terminal may "enable" or "disable" the corresponding profile.

(3) A case in which it is determined that the requested profile recovery is possible (Scenario 2).

Referring to FIG. 9, in step S920, the RSP server 990 may generate a remote profile management package (RPMpackage) to be transmitted to the source terminal 910. Here, the RPMpackage may include one or more of the following remote profile management commands (RPMcommand):

- Enable the profile;
- Disable the profile; and/or
- Recover the profile.

The RSP server 990 may transmit the RPMpackage to the terminal 910. Here, in order to ensure the reliability and integrity of the RPMpackage, the RSP server may additionally transmit the digital signature value.

Referring to FIG. 9, the following process may be performed in step S925.

The source terminal 910 may identify the message received in step S920. The source terminal may verify the validity of the received digital signature. The source terminal may identify the contents of the received RPMpackage so as to identify an operation that needs to be performed by the source terminal itself.

The source terminal 910 may recover the corresponding profile. That is, the source terminal may make the corresponding profile to be in a usable state. For example, the source terminal may "enable" or "disable" the corresponding profile.

The source terminal 910 may generate a remote profile management execution result (loadRPMpackageresult) based on the result of performing the remote profile management command. The "remote profile management performance result" may include one or more of the following pieces of information:
- A profile delimiter of a profile for which the remote profile management command has been performed; and/or
- Remote profile management commands that have been performed:
  - The profile has been enabled;
  - The profile has been disabled; and/or
  - The profile has been recovered.

The source terminal 910 may transmit the "remote profile management performance result", which has been generated, to the RSP server 990.

(4) A case in which it is determined that the requested profile recovery is possible (Scenario 3).

Referring to FIG. 9, the following process may be performed in step S920.

The RSP server 990 may prepare a remote profile management package (RPMpackage) to be transmitted to the source terminal 910. Here, RPMpackage may include one or more of the following remote profile management commands (RPMcommands) in order to perform profile recovery:
- Enable the profile;
- Disable the profile; and/or
- Recover the profile.

After the RSP server prepares the RPMpackage to be transmitted to the source terminal through the above process, the RSP server may perform one or more of the following operations:
- Store RPMpackage to be transmitted to the source terminal; and/or
- Register, in another RSP server (other open mediation server (SM-DS)), an indication that there is RPMpackage to be transmitted to the source terminal.

The RSP server 990 may transmit one or more of the following pieces of information to the source terminal 910:
- Profile recovery is approved; and/or
- RPMpackage is prepared.

Thereafter, as shown in FIG. 8, a "process of recovering a profile in a suspended state" may be performed through remote profile management.

Figure 10:
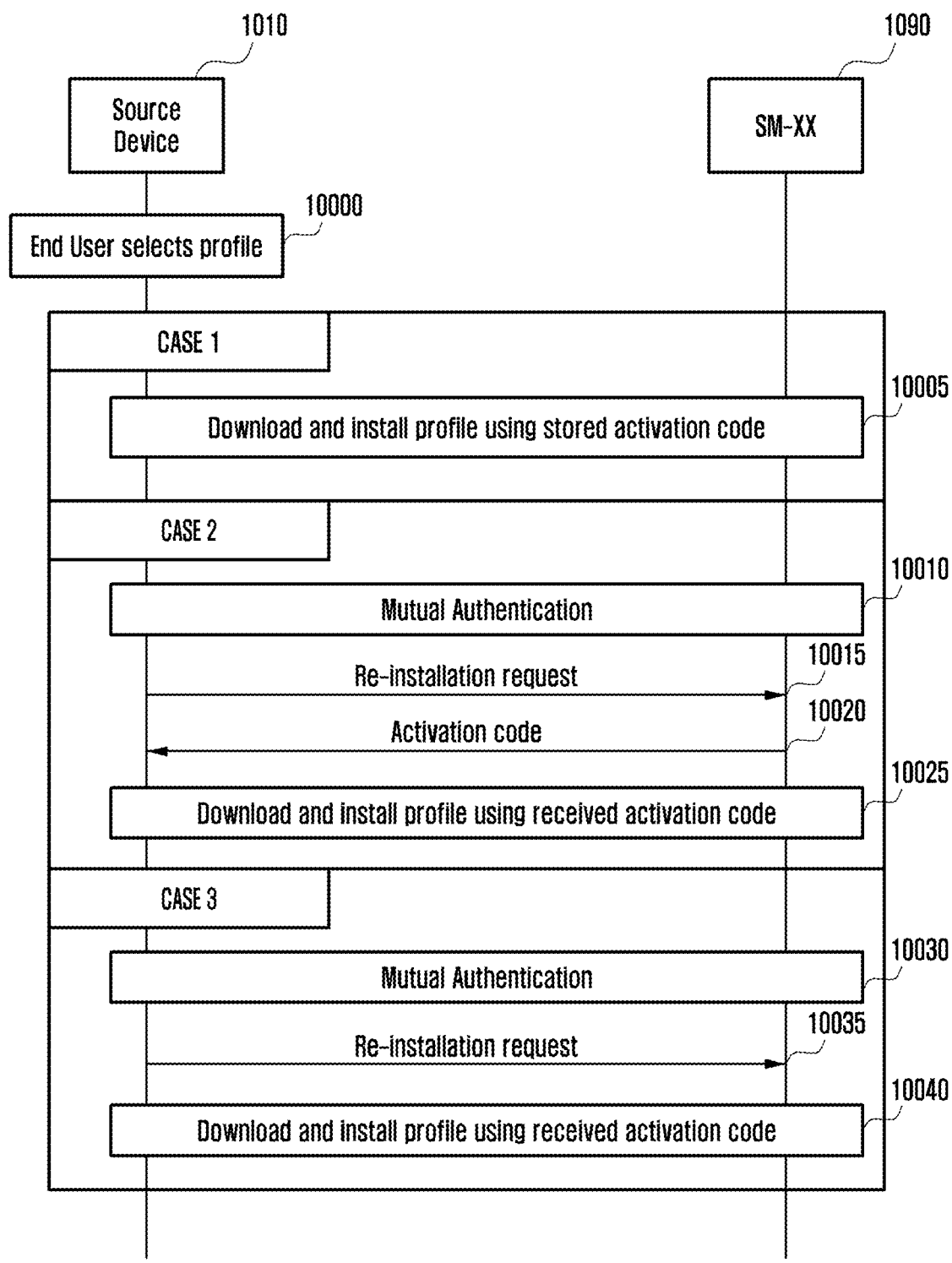
FIG. 10 illustrates a method for reinstalling a deleted profile in a source terminal to perform a device change according to an embodiment of the disclosure.

FIG. 10 illustrates a method of reinstalling a deleted profile in a source terminal to perform a device change according to an embodiment of the disclosure. In FIG. 10, the term "reinstallation" of a deleted profile may have the same meaning as the term "recovery" of the deleted profile.

The source terminal 1010 illustrated in FIG. 10 may include at least one LPA and at least one eSIM. For the RSP server 1090, reference will be made to the description of FIG. 2.

An embodiment of the method provided in FIG. 10 may be performed when the profile is not normally installed in a target terminal through the process shown in FIG. 6. That is, after performing step S600, if an error occurs in steps after S605 and thus the profile is not normally installed in the target terminal, the process of FIG. 10 may be performed. A case in which the profile is not normally installed in the target terminal is referred to as a "case in which normal profile installation in the target terminal has failed", and a detailed description of the "case in which normal profile installation in the target terminal has failed" is as follows.

[A case in which normal profile installation in the target terminal has failed]

The "case in which normal profile installation in the target terminal has failed" may include at least one of the cases listed below.
- A case in which the target device does not request profile download and installation;
- A case in which the target terminal requests profile download and installation but an error occurs at the time of the profile download. Possible examples of the occurrence of an error at the time of the profile download may be as follows:
  - Mutual authentication failed between the target terminal and the RSP server in step S620;
  - Eligibility check failed in step S620; and/or
  - Profile installation rejected by a user in step S620;
- A case in which, although the target terminal has requested profile download and installation, a permanent error occurs at the time of profile installation; and/or
- A case in which a temporary error occurring at the time of profile installation exceeds the number of allowed retry limits although the target terminal has requested profile download and installation, that is, when a temporary error occurs, the RSP server and the target terminal can try profile installation as many times as the allowed retry limits (here, the number of allowed retry limits is a positive integer value including 0), but the profile installation fails due to exceeding the allowed retry limits.

A permanent error occurring at the time of profile installation refers to a type of error in which the profile installation cannot be performed even if the target terminal retries installation of the corresponding profile. For example, a permanent error may refer to errors that may occur during installation except for a temporary error that will be described later.

A temporary error occurring at the time of profile installation refers to a type of error in which the profile installation may be possible when the target terminal retries to install the corresponding profile. A possible temporary error at the time of profile installation may be one of the following examples:
- Install failed due to insufficient memory: installation error due to insufficient installation space in eUICC; or
- Install failed due to interruption: installation error due to unexpected interruption in performing operation.

In FIG. 10, various embodiments of re-installing the deleted profile in the source terminal through steps S1000 to S1040 are illustrated.

Various embodiments of re-installing the deleted profile in the source terminal, which will be described in this figure, may largely include the following two processes:
- STEP1. Request: The source terminal transmits a recovery request to the RSP server; and
- STEP2. Accept: The RSP server accepts the request from the source terminal and performs recovery.

As described above, the execution conditions of two processes (STEP1. request, STEP2. Accept) common to all embodiments to be described later may be as follows.

[STEP1. Request]

As described above in FIG. 4, the source terminal may include a "device change method (or device change type)" related to the deleted profile, and the "device change method" may include a "recovery request allowance indicator" indicating whether a recovery request of the deleted profile can be performed. The source terminal may request recovery of the deleted profile only if the recovery request allowance indicator is configured as "request allowed."

[STEP2. Accept]

When the server receives a request for recovery of the deleted profile from the terminal, the server may perform recovery after determining whether to perform recovery. Here, conditions for performing the recovery may include all or part of the conditions described below:

Received a request for recovery (or reinstallation) of the profile from the terminal;

A recovery request allowance indicator associated with the profile is configured as "request allowed";

The recovery request indicator has been transmitted to the source terminal;

The terminal having requested profile recover is identical to the source terminal; and/or Identify that [a case in which normal profile installation in the target terminal has failed] has occurred.

Based on the conditions described above, various embodiments of re-installing the deleted profile in the source terminal will be described through steps S1000 to S1040 below.

Referring to FIG. 10, the following process may be executed in step S1000.

The source terminal may acquire information of the profile to be reinstalled. For example, a user or a subscriber may select information of a profile to be reinstalled through a UI provided by the source terminal. Here, the possible example of the UI is as follows:

i) The source terminal may provide contents of the deleted profile to a user or subscriber for device change;

ii) The source terminal may provide a user or subscriber with an input method for reinstalling the deleted profile for device change;

iii) The user or subscriber may select a profile for reinstallation from among the deleted profiles for device change by using the above input method; and/or iv) The source terminal may identify a profile to be reinstalled through the input of the user or subscriber.

The source terminal may acquire the address of the RSP server 1090 to be accessed to reinstall the selected profile. Here, some possible examples of a method for obtaining the address of the RSP server to which the source terminal may access are as follows:

The address of the RSP server to be accessed to reinstall the profile is pre-stored in a terminal and/or profile (meta data);

Utilize the address of the RSP server shown in FIG. 6. That is, the address of the RSP server to be accessed for device change is (re)used; and/or Access another RSP server (e.g., another open mediation server (SM-DS)) to acquire the address of the RSP server to be accessed for reinstallation.

Referring to FIG. 10, after step S1000, one of the following processes may be performed in some cases.

[CASE 1]

This case may be performed when the source terminal stores an activation code prepared in step S605 or S610 of FIG. 6 (this activation code is referred to as a "stored activation code").

This case may be performed when the source terminal is not subject to step S410 of FIG. 4 (i.e., the process of FIG. 7), may be performed when the source terminal is subject to step S410 of FIG. 4 (i.e., the process of FIG. 7) but did not transmit the eUICC identifier of the target terminal to the RSP server, or may be performed when, although the source terminal has transmitted the eUICC identifier of the target terminal to the RSP server through step S410 of FIG. 4 (i.e., the process of FIG. 7), the RSP server does not bind the "profile prepared for device change" and the "eUICC identifier of the target terminal" (that is, a configuration is made such that only a terminal having the corresponding eUICC identifier can receive the profile). This case may be provided when the RSP server does not designate a specific terminal (e.g., a target terminal) rather than a source terminal as a terminal capable of receiving the "profile prepared for device change" (This case is simply referred to as "a case in which the profile is not bounded to the target terminal").

Here, the following process may be performed.

Referring to FIG. 10, the following process may be performed in step S1005.

In one example, the source terminal may transmit, to the RSP server, a request for reinstallation by using the "stored activation code." Here, conditions under which the source terminal can request reinstallation may follow [STEP1. Request] condition.

In one example, the RSP server may determine whether to perform reinstallation after receiving a request from the source terminal. Here, conditions under which the RSP server determines whether to accept the reinstallation may follow [STEP2. Accept] condition.

In one example, the RSP server may perform eligibility check as to whether the "profile prepared for device change," which is prepared in advance, can be installed in the source terminal 1010. The eligibility check may be performed by receiving eUICC information (euiccinfo2) of the source terminal 1010 and information (deviceinfo) such as LPA and modem. When the "profile prepared for device change" is not suitable for the source terminal 1010, the RSP server may prepare a profile suitable for the source terminal 1010 for reinstallation.

In one example, all or part of the three processes described above (that is, a process in which the source terminal transmits a request for reinstallation to the RSP server by using the "stored activation code," a process in which the RSP server determines whether to perform reinstallation after receiving the request from the source terminal, and a process in which the RSP server performs the eligibility check and, if necessary, prepares a profile suitable for the source terminal) may be performed as part of a process to be described later, that is, a process in which the source terminal receives a profile from the RSP server and reinstalls the profile. For example, the source terminal may perform mutual authentication with the RSP server in order to receive a profile from the RSP server and reinstall the profile, and the three processes above may be performed as part of this process.

In one example, the source terminal may receive the profile from the RSP server and reinstall the profile. The process is similar to steps S620 to S625 provided in FIG. 6. (There is a difference in that the operation, which is performed by a target terminal in steps 620 to S625, is performed by the source terminal in the disclosure.)

[CASE 2]

This case may be performed when "the profile is bounded to the target terminal". That is, this case may be performed when the RSP server designates a specific terminal (e.g., a target terminal) rather than a source terminal as a terminal capable of receiving the "profile prepared for device change." However, this case may be performed even in "the case in which the profile is not bounded to the target terminal."

Here, the following process may be performed.

Referring to FIG. 10, mutual authentication may be performed between the source terminal 1010 and the RSP server 1090 in step S1010. The mutual authentication process may include one or more of the following example processes.

In one example, the mutual authentication process may include a certificate negotiation process that needs to be performed in order for the source terminal 1010 and the RSP server 1090 to perform communication. For example, the source terminal 1010 may transmit, to the RSP server 1090, pieces of certificate information that can be used to verify the RSP server 1090 and/or pieces of certificate information that can be used by the RSP server 1090 in order to verify the source terminal 1010. Upon receiving this information, the RSP server 1090 may select pieces of certificate information to be used by the source terminal 1010 to verify the RSP server 1090 and/or pieces of certificate information that can be used by the RSP server 1090 in order to verify the source terminal 1010. Here, the pieces of certificate information selected by the RSP server 1090 may be transmitted to the source terminal 1010. Through this process, the source terminal 1010 and the RSP server 1090 may acquire pieces of certificate information for mutual authentication. Here, the certificate information may be a certificate, information included in the certificate, and/or a series of information that may refer to the certificate.

In another example, the source terminal 1010 may transmit a predetermined random number (eUICC challenge) value generated by the source terminal 1010 itself to the RSP server 1090. The RSP server 1090 may digitally sign the received random number value and then transmit the signature value to the source terminal 1010. The source terminal 1010 may verify the received signature value so as to authenticate the RSP server 1090.

In yet another example, the RSP server 1090 may transmit a predetermined random number (server challenge) value generated by itself to the source terminal 1010. The source terminal 1010 may digitally sign the received random number value and then transmit the signature value to the RSP server 1090. The RSP server 1090 may verify the received signature value so as to authenticate the source terminal 1010.

In yet another example, during communication between the RSP server 1090 and the source terminal 1010, an ID (transaction ID) for managing a session may be exchanged. For example, the RSP server 1090 may generate a transaction ID and transmit the ID value to the source terminal 1010. Here, the digital signature value of the RSP server 1090 may be added in order to verify the reliability and integrity of the transaction ID.

In yet another example, the RSP server 1090 and the source terminal 1010 may exchange their own IDs. For example, the RSP server 1090 may provide its own object identifier (OID) to the source terminal 1010. As another example, the source terminal 1010 may provide its own eUICC identifier to the RSP server 1090.

Referring to FIG. 10, the following process may be performed in step S1015.

The source terminal 1010 may transmit a request for profile reinstallation to the RSP server 1090. Here, the source terminal 1010 may transmit, to the RSP server 1090, a profile delimiter of a profile to be requested for reinstallation. In addition, conditions under which the source terminal can request reinstallation may follow [STEP1. Request] condition described above.

Referring to FIG. 10, the following process may be performed in step S1020.

The RSP server 1090 may determine whether to perform reinstallation based on a request message received in step S1015. The condition under which the RSP server determines whether to accept the reinstallation may follow [STEP2. Accept] condition.

As a result of the determination, if the RSP server determines to reinstall the profile, the RSP server may prepare an activation code required for installation of the profile and transmit the activation code to the source terminal. Here, the activation code may include one or more of the following pieces of information:

Information indicating the format of the activation code;
Information (e.g., address and/or OID) of the RSP server to which the source terminal may access to download the profile; and/or
Information indicating a profile that the source terminal wants to download. (For example, a matching ID associated with the profile to be downloaded. The matching ID may be generated by the RSP server and connected to the profile, and thus managed by the RSP server).

The activation code transmitted from the RSP server to the source terminal may be referred to as a "received activation code."

In addition, when the RSP server determines to reinstall the corresponding profile, the RSP server may perform eligibility check as to whether a "profile prepared for device change," which is previously prepared, can be installed in the source terminal 1010. This process may be performed by receiving eUICC information (euiccinfo2) of the source terminal 1010 and information (deviceinfo) such as LPA and modem. When the "profile prepared for device change" is not suitable for the source terminal 1010, the RSP server may prepare a profile suitable for the source terminal 1010 for reinstallation.

All or part of steps S1015 and S1020 may be performed as a part of the above-described step S1010. That is, the RSP server and the source terminal may exchange messages in order to perform mutual authentication in step S1010, and the exchanged messages may include all or part of messages required for steps S1015 and S1020 and may be transmitted. In addition, in order to perform mutual authentication in step S1010, the RSP server and the source terminal perform operations required for mutual authentication, such as processing a received message and generating a message to be transmitted, and as part of this operation, all or part of operations required for steps S1015 and S1020 may be performed.

Referring to FIG. 10, in step S1025, the source terminal may download a profile from the RSP server by using the "received activation code" and install the profile. The process is the same as step S1005 described above, and differs from step S1005 in that if the "stored activation code" is used in step S1005, the "received activation code" is used in step S1025.

[CASE 3]

This case may be performed when "the profile is bounded to the target terminal". That is, this case may be performed when the RSP server designates a specific terminal (e.g., a target terminal) rather than a source terminal as a terminal capable of receiving the "profile prepared for device change." However, this case may be performed even in "a case in which the profile is not bound to the target terminal."

Here, the following process may be performed.

Referring to FIG. 10, mutual authentication may be performed between the source terminal 1010 and the RSP server 1090 in step S1030. The mutual authentication process may include one or more of the following example processes.

In one example, the mutual authentication process may include a certificate negotiation process that needs to be performed in order for the source terminal 1010 and the RSP server 1090 to perform communication. For example, the source terminal 1010 may transmit, to the RSP server 1090, pieces of certificate information that can be used to verify the RSP server 1090 and/or pieces of certificate information that can be used by the RSP server 1090 in order to verify the source terminal 1010. Upon receiving this information, the RSP server 1090 may select pieces of certificate information to be used by the source terminal 1010 to verify the RSP server 1090 and/or pieces of certificate information that can be used by the RSP server 1090 in order to verify the source terminal 1010. Here, the pieces of certificate information selected by the RSP server 1090 may be transmitted to the source terminal 1010. Through this process, the source terminal 1010 and the RSP server 1090 may acquire pieces of certificate information for mutual authentication. Here, the certificate information may be a certificate, information included in the certificate, and/or a series of information that may refer to the certificate.

In another example, the source terminal 1010 may transmit a predetermined random number (eUICC challenge) value generated by the source terminal 1010 itself to the RSP server 1090. The RSP server 1090 may digitally sign the received random number value and then transmit the signature value to the source terminal 1010. The source terminal 1010 may verify the received signature value so as to authenticate the RSP server 1090.

In yet another example, the RSP server 1090 may transmit a predetermined random number (server challenge) value generated by itself to the source terminal 1010. The source terminal 1010 may digitally sign the received random number value and then transmit the signature value to the RSP server 1090. The RSP server 1090 may verify the received signature value so as to authenticate the source terminal 1010.

In yet another example, during communication between the RSP server 1090 and the source terminal 1010, an ID (transaction ID) for managing a session may be exchanged. For example, the RSP server 1090 may generate a transaction ID and transmit the ID value to the source terminal 1010. Here, the digital signature value of the RSP server 1090 may be added to verify the reliability and integrity of the transaction ID.

In yet another example, the RSP server 1090 and the source terminal 1010 may exchange their own IDs. For example, the RSP server 1090 may provide its own object identifier (OID) to the source terminal 1010. As another example, the source terminal 1010 may provide its own eUICC identifier to the RSP server 1090.

Referring to FIG. 10, the following process may be performed in step S1035.

The source terminal 1010 may transmit a request for reinstallation of a profile to the RSP server 1090. Here, the source terminal 1010 may transmit, to the RSP server 1090, a profile delimiter of the profile for which reinstallation is requested. In addition, conditions under which the source terminal can request reinstallation may follow [STEP1. Request] condition described above.

The RSP server 1090 may determine whether to perform reinstallation based on the received request message. Here, conditions under which the RSP server determines whether to accept the reinstallation may follow [STEP2. Accept] condition.

As a result of the determination, if the RSP server determines to reinstall the profile, step S1040 may be performed.

In addition, when the RSP server determines to reinstall the corresponding profile, the RSP server may perform eligibility check as to whether a "profile prepared for device change," which is prepared in advance, can be installed in the source terminal 1010. This process may be performed by receiving eUICC information (euiccinfo2) of the source terminal 1010 and information (deviceinfo) such as LPA and modem. When the "profile prepared for device change" is not suitable for the source terminal 1010, the RSP server may prepare a profile suitable for the source terminal 1010 for reinstallation.

All or part of step S1035 may be performed as a part of step S1030 described above. That is, in order to perform mutual authentication in step S1030, messages are exchanged between the RSP server and the source terminal, and all or part of messages required for step S1035 may be included in the messages exchanged therebetween and transmitted. In addition, in order to perform mutual authentication in step S1030, the RSP server and the source terminal perform operations required for mutual authentication, such as processing a received message and generating a message to be transmitted, and as part of this operation, all or part of operations required for step S1035 may be performed.

Referring to FIG. 10, in step S1040, a profile download and installation process may be performed between the source terminal 1010 and the RSP server 1090. The RSP server 1090 may transmit the prepared profile to the source terminal 1010. The profile may be a profile prepared in step S1035 or a profile prepared in this step in response to a request from the source terminal. The source terminal 1010 may install the received profile.

FIG. 11 illustrates still another example of a process in which a device change is performed according to an embodiment of the disclosure.

Specifically, the process of FIG. 11 may be performed when the "information relating to processing a profile installed in a source terminal 1110" of the "device change method" is configured to indicate no special operation for the profile. That is, this process may be performed when the corresponding file is deleted or configured not to be in a suspended state.

The source terminal 1110 and a target terminal 1150 shown in FIG. 11 may each include at least one LPA and at least one eSIM. An RSP server 1190 will be described with reference to FIG. 2.

Referring to FIG. 11, in step S1105, the source terminal 1110 may transmit an activation code to the target terminal 1150.

The activation code to be transmitted to the target terminal 1150 may be prepared using various methods. For example, two possible methods are as follows:

The source terminal 1110 may extract an activation code included in the "device change method" and prepare to transmit the activation code to the target terminal 1150; and The source terminal 1110 may generate an activation code by itself and prepare to transmit the activation code to the target terminal 1150.

The activation code to be transmitted to the target terminal described above may include one or more of the following pieces of information:

Information indicating the format of the activation code;
Information (e.g., address and/or OID) of the RSP server to which the target terminal 1150 may access to download the profile; and/or
Information indicating a profile that the target terminal 1150 wants to download. For example, possible information is as follows:
  A profile delimiter of a profile to be downloaded; and/or
  Matching ID associated with a profile to be downloaded. This matching ID may be generated by the RSP server and connected to the corresponding profile, and thus managed by the RSP server.

The activation code above may be transmitted via one of the various methods provided below.

In one example, the source terminal 1110 may provide information to be transmitted to the target terminal 1150 to a user through a UI of the source terminal 1110. The user may input the received information by using a UI of the target terminal 1150.

In another example, the source terminal 1110 generates information, which needs to be transmitted to the target terminal 1150, in the form of an image (e.g., a QR code) and the generated image is displayed on the screen of the source terminal. The user scans the image displayed on the screen of the source terminal 1110 by using the target terminal 1150 so as to transmit the information to the target terminal 1150.

In yet another example, a connection may be established between the source terminal 1110 and the target terminal 1150 and information may be transmitted using the established connection. Here, the connection established between the source terminal 1110 and the target terminal 1150 may be a direct device-to-device connection (e.g., NFC, Bluetooth, UWB, WiFi-Direct, LTE device-to-device (D2D), a wireless connection such as 5G D2D, or a wired connection such as cable connection), or may be a remote connection in which a remote server (e.g., a relay server) is located between the source terminal 1110 and the target terminal 1150.

Referring to FIG. 11, in step S1120, the target terminal 1150 may download and install a profile from the RSP server 1190. The above process may include procedures below.

The target terminal 1150 may establish a connection with the RSP server 1190, and may request, from the RSP server 1190, a profile by using information included in the activation code (e.g., information indicating a profile that the target terminal 1150 wants to download). The RSP server 1190 may prepare a profile to be transmitted to the target terminal 1150 based on the received information. In the above process, at least one of the following processes may be further included:
  Mutual authentication between the target terminal 1150 and the RSP server 1190;
  Eligibility check, which is performed by the RSP server 1190, of identifying whether the profile to be transmitted can be normally installed and operated in the target terminal 1150; or
  User consent for installation of the corresponding profile in the target terminal 1150.

The RSP server 1190 may transmit the prepared profile to the target terminal 1150. The target terminal 1150 may install the profile, which is received from the RSP server 1190, in the target terminal 1150 (e.g., the eUICC of the target terminal).

Referring to FIG. 11, the following process may be performed in step S1115.

If the profile installation fails, the target terminal 1150 may transmit, to the RSP server 1190, a profile installation result indicating that the profile installation has failed. Here, steps S1120 to S1135 may be omitted. In addition, here, the source terminal 1110 may continue to use the installed corresponding profile.

If the profile installation is successful, the installed profile may be configured to be in an "unusable" state. The "unusable" state may denote that the profile is normally installed in the terminal, but cannot be used without an approval procedure of the RSP server (e.g., steps S1120 to S1135 to be described later) (e.g., a state that cannot be changed to an "enabled state" or "disabled" state). Here, the target terminal 1150 may transmit, to the RSP server 1190, a profile installation result indicating that the profile installation is successful. Here, the profile installation result may further include information indicating that the profile installation is successful but is configured currently to be in a disabled state.

Referring to FIG. 11, in step S1120, the RSP server 1190 may transmit a request for state change of a profile to the source terminal 1110. The detailed process is as follows.

The process of establishing a connection between the RSP server 1190 and the source terminal 1110 for communication may be provided using various method. Some possible examples are provided as follows:

In one example, when the source terminal and the RSP server perform communication in step S410 of FIG. 4, the established connection is maintained without being released and can be used for communication in step S1120. Some possible examples are provided as follows:
  The source terminal may be waiting while maintaining the connection after completing step S740. Thereafter, the RSP server may perform step S1120 in order to request a profile state change (for example, the RSP server may use a push method); and/or
  Although not shown in the drawing, the source terminal may transmit a message in order to identify whether there is a profile state change message to be transmitted by the RSP server after step S740 is completed. If there is the profile state change message to be transmitted by the RSP server, step S1120 may be performed. If the RSP server determines that there is no need to transmit the profile state change message, the process after step S1120 may be omitted. If the RSP server has not yet determined whether to transmit the profile state change message at a time point at which a confirmation request message from the source terminal is received, the RSP server may wait until determination as to whether to transmit the profile state change message is made, and then may perform step S1120. Alternatively, if the RSP server has not yet determined whether to transmit the profile state change message at a time point at which the confirmation request message from the source terminal is received, the RSP server may transmit a message indicating waiting a little longer to the source terminal, and the source terminal may transmit again the confirmation message to the RSP server in order to identify that there is a profile state change message. (That is, various types of polling schemes may be used).

In another example, if step S410 of FIG. 4 is not performed, or if the connection between the source terminal and the RSP server is released even though step S410 is performed, a new connection may be established between the source terminal and the RSP server. Some possible examples are provided as follows:

The source terminal first tries a connection with the RSP server automatically or at the request of a user, and then step S1120 may be performed through the established connection;

The RSP server may perform step S1120 through a scheme such as a push to the source terminal; and/or The RSP server 1190 registers, in another RSP server (e.g., a discovery (DS) server), an indication that there is a request for profile state change, and the source terminal may identify, from the other RSP server, that access to the RSP server 1190 needs to be performed, and then may access to the RSP server 1190 so as to perform step S1120.

The profile state change request message transmitted by the RSP server 1190 to the source terminal 1110 may include one or more of the followings:

A profile delimiter of a profile for which state change is to be requested;

Information of the RSP server (e.g., OID indicating the RSP server);

eUICC identifier of the source terminal;

Desired change method;

Delete a profile;

Change a profile to be in a suspended state; and/or

A digital signature value used by the RSP server 1190 to sign with regard to a part and/or all of the message.

Referring to FIG. 11, the following process may be performed in step S1125.

The source terminal may change the state of a profile according to a state change request of the RSP server. For example, one of the following two processes may be performed.

Delete the profile; or

Configure the profile to be in a suspended state.

The source terminal may transmit a result of the state change performed by the source terminal itself to the RSP server. Here, a state change result message transmitted by the source terminal to the RSP server may include one or more of the following items:

A profile delimiter of a profile for which state change has been performed;

Information of the RSP server (e.g., OID indicating the RSP server);

An eUICC identifier of the source terminal;

A result of state change that has been performed:

Delete profile; and/or profile to be in a suspended state; and/or

A digital signature value used by the source terminal to sign with regard to a part and/or all of the message.

The state change result message transmitted by the source terminal to the RSP server may be transmitted using various methods. Some possible examples are as follows:

Transmit as a response message to step S1120; and/or

Transmitted through an independent notification procedure.

Referring to FIG. 11, in step S1130, the RSP server 1190 may transmit a request for state change of a profile to the target terminal 1110. The detailed process is as follows.

The process of establishing a connection between the RSP server 1190 and the target terminal 1150 for communication may be provided using various methods. Some possible examples are as follows.

In one example, if the connection established between the target terminal and the RSP server is maintained without being released even after step S1115, this connection may be reused. Some possible examples are as follows:

The target terminal may be waiting while maintaining the connection after completing step S1115. Thereafter, the RSP server may perform step S1130 in order to request for state change of a profile.

In one example, although not shown in the drawing, the RSP server may transmit a message requesting waiting to the target terminal after step S1115. Thereafter, step S1130 may be performed at a time point at which the RSP server needs to request a profile state change.

In another example, although not shown in the figure, the RSP server may transmit a message requesting waiting to the target terminal after step S1115. Thereafter, the target terminal may transmit a message to identify whether there is a profile state change message to be transmitted by the RSP server. If there is a profile state change message to be transmitted by the RSP server, step S1130 may be performed. If the RSP server determines that there is no need to transmit the profile state change message, the process after step S1130 may be omitted. If the RSP server has not yet determined whether to transmit the profile state change message at a time point at which a confirmation request message from the source terminal is received, the RSP server may wait until determination as to whether to transmit the profile state change message is made, and then may perform step S1130. Alternatively, if the RSP server has not yet determined whether to transmit the profile state change message at a time point at which the confirmation request message from the target terminal is received, the RSP server may transmit a message indicating waiting a little longer to the target terminal, and the target terminal may transmit again the confirmation message to the RSP server in order to identify that there is a profile state change message (that is, various types of polling schemes may be used).

In one example, if the connection between the target terminal and the RSP server is released after step S1115, a new connection may be established between the target terminal and the RSP server. Some possible examples are provided as follows:

The target terminal first tries a connection with the RSP server automatically or at the request of a user, and then step S1130 may be performed through the established connection;

The RSP server may perform step S1130 through a scheme such as a push to the target terminal; and/or The RSP server 1190 registers, in another RSP server (e.g., a discovery (DS) server), an indication that there is a request for profile state change, and the target terminal may identify, from the other RSP server, that access to the RSP server 1190 needs to be performed, and then may access to the RSP server 1190 so as to perform step S1130.

The profile state change request message transmitted by the RSP server 1190 to the target terminal 1150 may include one or more of the followings:

A profile delimiter of a profile for which state change is to be requested;

Information of the RSP server (e.g., OID indicating the RSP server);

An eUICC identifier of the target terminal;

Desired change method:

Make a profile to be in a usable state. For example, the following two state change is possible:

Change the profile to be in an enabled state; and/or

Change the profile to be in a disabled state; and/or

A digital signature value used by the RSP server 1190 to sign with regard to a part and/or all of the message.

Referring to FIG. 11, the following process may be performed in step S1135.

The target terminal may change the state of a profile according to the state change request of the RSP server. That is, the source terminal may configure the profile to be in an enabled state according to a state change request of the RSP server. For example, one of the following two processes may be performed:

Configure the profile to be in an enabled state; or
Configure the profile to be in a disabled state.

The target terminal may transmit a result of the state change performed by the target terminal itself to the RSP server. Here, a state change result message transmitted by the target terminal to the RSP server may include one or more of the followings: and/or A profile delimiter of a profile for which state change has been performed;
Information of the RSP server (e.g., OID indicating the RSP server);
An eUICC identifier of the target terminal;
Result of state change that has been performed:
Configure the profile to be in a usable state (for example, the following two results are possible):
Configure the profile to be in an enabled state; and/or
Configure the profile to be in a suspended state; and/or
A digital signature value used by the target terminal to sign with regard to a part and/or all of the message.

The state change result message transmitted by the target terminal to the RSP server may be transmitted using various methods. Some possible examples are as follows:

Transmit as a response message to step S1130; and/or
Transmitted through an independent notification procedure.

Figure 12:
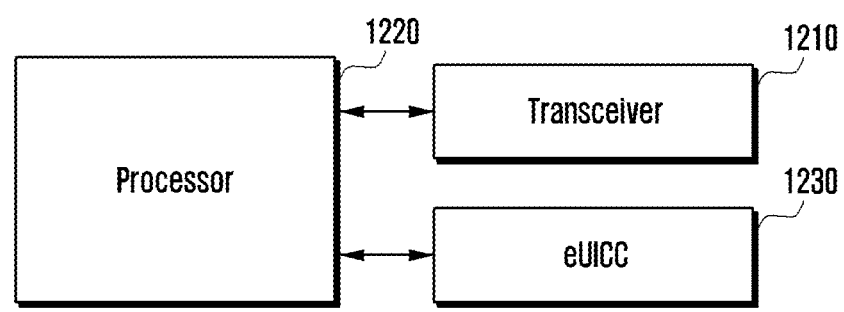
FIG. 12 illustrates a configuration of a terminal equipped with an eUICC according to an embodiment of the disclosure.

FIG. 12 illustrates a configuration of a terminal equipped with an eUICC according to an embodiment of the disclosure.

Referring to FIG. 12, the terminal may include a transceiver 1210, a processor 1220, and a eUICC 1230. Some of the terminals described above in the disclosure may correspond to the terminal described in FIG. 12. However, the configuration of the terminal is not limited to FIG. 12, and may include more or fewer elements than the elements shown in FIG. 12. According to an embodiment, the transceiver 1210, the processor 1220, and the eUICC 1230 may be implemented in the form of one chip. In addition, the terminal may further include a memory, and the processor 1220 may be configured as at least one processor.

According to various embodiments, the transceiver 1210 may transmit or receive, to or from a transceiver of another terminal or an external server, signals, information, data, etc. according to various embodiments of the disclosure. The transceiver 1210 may include an RF transmitter for up-converting and amplifying a frequency of a transmitted signal, and an RF receiver for low-noise amplifying a received signal and down-converting a frequency thereof. However, this is only an embodiment of the transceiver 1210, and the elements of the transceiver 1210 are not limited to the RF transmitter and the RF receiver. In addition, the transceiver 1210 may receive a signal through a wireless channel and output the signal to the processor 1220, and transmit a signal output from the processor 1220 through a wireless channel.

Meanwhile, the processor 1220 is an element for overall control of the terminal. The processor 1220 may control the overall operation of the terminal according to various embodiments of the disclosure as described above.

Meanwhile, the terminal may further include a memory (not shown), and may store data, such as a basic program, an application program, and configuration information for the operation of the terminal, in the memory. In addition, the memory may include at least one storage medium among a flash memory type, a hard disk type, a multimedia card micro type, a card type memory (e.g., SD or XD memory, etc.), a magnetic memory, a magnetic disk, an optical disk, a random access memory (RAM), a static random access memory (SRAM), a read-only memory (ROM), a programmable read-only memory (PROM), an electrically erasable programmable read-only memory (EEPROM). In addition, the processor 1220 may perform various operations using various programs, contents, data, etc. stored in the memory.

Figure 13:
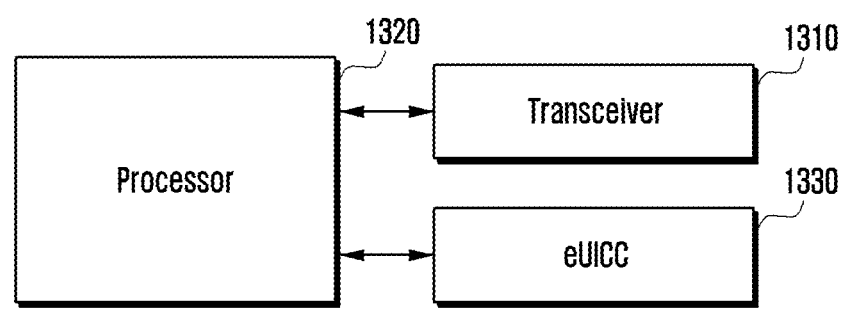
FIG. 13 illustrates a configuration of an RSP server according to an embodiment of the disclosure.

FIG. 13 illustrates a configuration of an RSP server according to an embodiment of the disclosure.

Referring to FIG. 13, the server may include a transceiver 1310 and a processor 1320. Some of the server(s) described above in the disclosure may correspond to the server described in FIG. 13. However, the configuration of the server is not limited to FIG. 13, and may include more or fewer elements than the elements shown in FIG. 13. According to an embodiment, the transceiver 1310 and the processor 1320 may be implemented in the form of one chip. In addition, the server may further include a memory, and the processor 1320 may be configured as at least one processor.

According to an embodiment, the transceiver 1310 may transmit or receive, to or from the terminal, signals, information, and data according to various embodiments of the disclosure. The transceiver 1310 may include an RF transmitter for up-converting and amplifying a frequency of a transmitted signal, and an RF receiver for low-noise amplifying a received signal and down-converting a frequency thereof. However, this is only an embodiment of the transceiver 1310, and elements of the transceiver 1310 are not limited to the RF transmitter and the RF receiver. In addition, the transceiver 1310 may receive a signal through a wireless channel and output the signal to the processor 1320, and may transmit a signal output from the processor 1320 through a wireless channel.

Meanwhile, at least one processor 1320 is an element for overall control of the server. The processor 1320 may control the overall operation of the server according to various embodiments of the disclosure as described above. The at least one processor 1320 may be referred to as a controller.

Meanwhile, the server may further include a memory (not shown), and may store data such as a basic program, an application program, and configuration information for the operation of the server. In addition, the memory may include at least one storage medium among a flash memory type, a hard disk type, a multimedia card micro type, a card type memory (e.g., SD or XD memory, etc.), a magnetic memory, a magnetic disk, an optical disk, a random access memory (RAM), a static random access memory (SRAM), a read-only memory (ROM), a programmable read-only memory (PROM), an electrically erasable programmable read-only memory (EEPROM). In addition, the processor 1320 may perform various operations using various programs, contents, data, etc. stored in the memory.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., a third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., program) including one or more instructions that are stored in a storage medium (e.g., internal memory or external memory) that is readable by a machine (e.g., computer). The machine is a device that can invoke, from a storage medium, instructions stored therein and operate according to the invoked instructions, and may include terminals according to various embodiments. When the instructions are executed by a processor (e.g., the processor 1420 of FIG. 14), the processor may perform functions corresponding to the instructions, with or without using other components under the control of the processor. The instructions may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each element (e.g., a module or a program) of the above-described elements may include a single entity or multiple entities. According to various embodiments, one or more of the above-described elements may be omitted, or one or more other elements may be added. Alternatively, or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first device in a communication system, the method comprising:
   transmitting, to a server, a device change request for installing a profile associated with the first device onto a second device;
   receiving, from the server, a device change response instructing to delete the profile, as a response to the device change request;
   deleting the profile from an embedded universal integrated circuit card (eUICC) in the first device based on the device change response;
   in case that the device change response includes an indication indicating support of a profile recovery, transmitting, to the server, a recovery request for recovery of the deleted profile based on a selection of the deleted profile for the profile recovery;
   receiving, from the server, a recovery response for the recovery request including information for the recovery of the deleted profile; and
   performing a profile download and installation procedure for the deleted profile, based on the information for the recovery of the deleted profile.

2. The method of claim 1,
   wherein an address of the server which has been stored in the first device is used for transmitting the recovery request, and
   wherein the deleted profile is selected based on a user interface of the first device.

3. The method of claim 1,
wherein the recovery response is based on a verification for a permanent error in a profile installation on the second device,
wherein the permanent error excludes insufficient memory for the profile and interruption during the profile installation, and
wherein the recovery request includes an integrated circuit card identity (ICCID) of the deleted profile.

4. The method of claim 2, further comprising:
performing a mutual authentication procedure with the server, based on the address of the server,
wherein the recovery request is transmitted after performing the mutual authentication procedure.

5. The method of claim 1,
wherein the information for the recovery of the deleted profile includes an activation code.

6. A method performed by a server in a communication system, the method comprising:
receiving, from a first device, a device change request for installing a profile in the first device onto a second device;
transmitting, to the first device, a device change response corresponding to the device change request instructing to delete the profile from an embedded universal integrated circuit card (eUICC) in the first device;
in case that the device change response includes an indication indicating support of a profile recovery, receiving, from the first device, a recovery request for recovery of the deleted profile based on a selection of the deleted profile for the profile recovery; and
transmitting, to the first device, a recovery response for the recovery request including information for the recovery of the deleted profile,
wherein a profile download and installation procedure is performed for the deleted profile, based on the information for the recovery of the deleted profile.

7. The method of claim 6, wherein an address of the server which has been stored in the first device is used for receiving the recovery request,
wherein the deleted profile is selected based on a user interface of the first device.

8. The method of claim 6,
wherein a recovery response is based on a verification for a permanent error in a profile installation on the second device,
wherein the permanent error excludes insufficient memory for the profile and interruption during the profile installation, and
wherein the recovery request includes an integrated circuit card identity (ICCID) of the deleted profile.

9. The method of claim 7, further comprising:
performing a mutual authentication procedure with the first device, based on the address of the server, and
wherein the recovery request is received after performing the mutual authentication procedure.

10. The method of claim 6, wherein the information for the recovery of the deleted profile includes an activation code.

11. A first device in a communication system, the first device comprising:
a transceiver;
an embedded universal integrated circuit card (eUICC); and
a controller operably connected to the transceiver and the eUICC, the controller configured to:

transmit, to a server via the transceiver, a device change request for installing a profile associated with the first device onto a second device,
receive, from the server via the transceiver, a device change response instructing to delete the profile, as a response to the device change request instructing to delete the profile,
delete the profile from the eUICC in the first device based on the device change response,
in case that the device change response includes an indication indicating support of a profile recovery, transmit, to the server via the transceiver, a recovery request for recovery of the deleted profile based on a selection of the deleted profile for the profile recovery,
receive, from the server via the transceiver, a recovery response for the recovery request including information for the recovery of the deleted profile, and
perform a profile download and installation procedure for the deleted profile, based on the information for the recovery of the deleted profile.

12. The first device of claim 11,
wherein an address of the server that has been stored in the first device is used for transmitting the recovery request, and
wherein the deleted profile is selected based on a user interface of the first device.

13. The first device of claim 11,
wherein the recovery response is based on a verification for a permanent error in a profile installation on the second device,
wherein the permanent error excludes insufficient memory for the profile and interruption during the profile installation, and
wherein the recovery request includes an integrated circuit card identity (ICCID) of the deleted profile.

14. The first device of claim 12,
wherein the controller is further configured to perform a mutual authentication procedure with the server based on the address of the server, and
wherein the recovery request is transmitted after performing the mutual authentication procedure.

15. The first device of claim 11,
wherein the information for the recovery of the deleted profile includes an activation code.

16. A server in a communication system, the server comprising:
a transceiver; and
a controller operably connected to the transceiver, the controller configured to:
receive, from a first device via the transceiver, a device change request for installing a profile in the first device onto a second device,
transmit, to the first device via the transceiver, a device change response corresponding to the device change request instructing to delete the profile from an embedded universal integrated circuit card (eUICC) in the first device,
in case that the device change response includes an indication indicating support of a profile recovery, receive, from the first device via the transceiver, a recovery request for recovery of the deleted profile based on a selection of the deleted profile for the profile recovery, and
transmit, to the first device, a recovery response for the recovery request including information for the recovery of the deleted profile, wherein a profile download and installation procedure is performed for the deleted profile, based on the information for the recovery of the deleted profile.

17. The server of claim 16, wherein an address of the server which has been stored in the first device is used for receiving the recovery request,
wherein the deleted profile is selected based on a user interface of the first device.

18. The server of claim 16,
wherein a recovery response is based on a verification for a permanent error in a profile installation on the second device,
wherein the permanent error excludes insufficient memory for the profile and interruption during the profile installation, and
wherein the recovery request includes an integrated circuit card identity (ICCID) of the deleted profile.

19. The server of claim 17, wherein the controller is further configured to perform a mutual authentication procedure with the first device, based on the address of the server, and
wherein the recovery request is received after performing the mutual authentication procedure.

20. The server of claim 16, wherein the information for the recovery of the deleted profile includes an activation code.

* * * * *